US010673508B2

(12) United States Patent
Liu et al.

(10) Patent No.: US 10,673,508 B2
(45) Date of Patent: Jun. 2, 2020

(54) CHANNEL STATE INFORMATION FEEDBACK METHOD, USER EQUIPMENT, AND BASE STATION

(71) Applicant: Huawei Technologies Co., Ltd., Shenzhen (CN)

(72) Inventors: Kunpeng Liu, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/505,204

(22) Filed: Jul. 8, 2019

(65) Prior Publication Data
US 2019/0334602 A1    Oct. 31, 2019

Related U.S. Application Data

(63) Continuation of application No. PCT/CN2018/071834, filed on Jan. 9, 2018.

(30) Foreign Application Priority Data

Jan. 9, 2017   (CN) .......................... 2017 1 0014457

(51) Int. Cl.
*H04B 7/02* (2018.01)
*H04B 7/06* (2006.01)
*H04L 25/02* (2006.01)

(52) U.S. Cl.
CPC ......... *H04B 7/0626* (2013.01); *H04B 7/0617* (2013.01); *H04L 25/0224* (2013.01)

(58) Field of Classification Search
CPC .. H04B 7/0626; H04B 7/0617; H04L 25/0224
(Continued)

(56) References Cited

U.S. PATENT DOCUMENTS

2013/0148515 A1    6/2013   Ribeiro et al.
2015/0222335 A1    8/2015   Jing et al.
(Continued)

FOREIGN PATENT DOCUMENTS

CA          2874463 C      5/2019
CN        103716078 A      4/2014
(Continued)

OTHER PUBLICATIONS

Xinwei, "Discussion on CSI Report for Non-precoding CSI-RS in FD-MIMO," 3GPP TSG RAN WG1 Meeting #82, R1-154688, Beijing, China, Aug. 24-28, 2015, 8 pages.
(Continued)

*Primary Examiner* — Zewdu A Kassa
(74) *Attorney, Agent, or Firm* — Slater Matsil, LLP

(57) ABSTRACT

This application provides a channel state information feedback method, user equipment, and a base station. A base station configures N first reference signal resources for UE, and sends the N first reference signal resources to the UE. The UE feeds back the CSI of the M first reference signal resources in a horizontal dimension and the M pieces of first reference signal resource indication information to the base station. This overcomes a disadvantage that only channel state information in a horizontal dimension is fed back in conventional channel estimation.

20 Claims, 8 Drawing Sheets

(58) Field of Classification Search
USPC ............... 375/267, 260, 259, 316, 219, 295
See application file for complete search history.

(56) References Cited

U.S. PATENT DOCUMENTS

| | | | |
|---|---|---|---|
| 2015/0229379 A1 | 8/2015 | Zhang et al. | |
| 2017/0104517 A1 | 4/2017 | Kakishima et al. | |
| 2019/0020396 A1* | 1/2019 | Wu | H04B 7/0626 |
| 2019/0182697 A1* | 6/2019 | Zhang | H04L 5/0023 |

FOREIGN PATENT DOCUMENTS

| | | |
|---|---|---|
| CN | 103841632 A | 6/2014 |
| CN | 104350689 A | 2/2015 |
| CN | 105634680 A | 6/2016 |
| CN | 106105073 A | 11/2016 |
| EP | 3073662 A1 | 9/2016 |
| EP | 3324550 A1 | 5/2018 |
| GB | 2507782 A | 5/2014 |
| WO | 2016051792 A1 | 4/2016 |

OTHER PUBLICATIONS

Chen, Wenhong et al., "Precoding and feedback for massive MIMO via beamformed CSIRS," 2016, 12 pages.

Itri, 3GPP TSG RAN WG1 Meeting #81, "Discussion of CSI reporting based on beamformed CSI-RS", Fukuoka, Japan, May 25-29, 2015, 3 pages.

* cited by examiner

Base station

User equipment

CHANNEL STATE INFORMATION FEEDBACK METHOD, USER EQUIPMENT, AND BASE STATION

CROSS-REFERENCE TO RELATED APPLICATIONS

This application is a continuation of International Application No. PCT/CN2018/071834, filed on Jan. 9, 2018, which claims priority to Chinese Patent Application 201710014457.1, filed on Jan. 9, 2017. The disclosures of the aforementioned applications are hereby incorporated by reference in their entireties.

TECHNICAL FIELD

This application relates to communications technologies, and in particular, to a channel state information feedback method, user equipment, and a base station.

BACKGROUND

In a long term evolution (LTE) system, a conventional antenna array has a fixed downtilt in a vertical direction, to be specific, the conventional antenna array provides a fixed beam for each user equipment in the vertical direction in a cell. To increase a cell edge user throughput and a cell average throughput, a three-dimensional (3D) beamforming (BF) technology is introduced. Based on an active antenna system (AAS), the 3D beamforming technology may generate beams with different downtilts for user equipments in the vertical direction based on locations of the user equipments, and perform beamforming in both a horizontal direction and the vertical direction. To support the 3D beamforming technology, corresponding channel state information needs to be fed back. The channel state information includes a channel quality indicator (CQI), a precoding matrix indicator (PMI), a rank indicator (RI), and the like.

Generally, the channel state information is obtained through channel estimation by the user equipment. In a conventional channel estimation process, the user equipment measures a reference signal (RS), also referred to as a pilot signal, for example, a channel state information-reference signal (CSI-RS), to estimate channel state information in a horizontal dimension and report the channel state information to a base station. However, for the 3D beamforming technology, the user equipment further needs to perform channel estimation on a channel in a vertical dimension in addition to channel estimation on a channel in the horizontal dimension. Obviously, the conventional channel estimation method only supporting channel estimation in the horizontal dimension is not applicable to the 3D beamforming technology.

Therefore, how to provide a channel state information feedback method is really a problem urgently to be resolved in the industry.

SUMMARY

This application provides a channel state information feedback method, user equipment, and a base station, to overcome a disadvantage that only channel state information in a horizontal dimension is fed back in conventional channel estimation.

According to a first aspect, this application provides a channel state information feedback method, where the method is described from a perspective of user equipment, and the method includes: configuring, by a base station, N first reference signal resources for UE, and sending the N first reference signal resources to the UE; and after receiving the first reference signal resources, and then determining CSI of the first reference signal resources and M pieces of first reference signal indication information based on a feedback mode, feeding back, by the UE, the CSI and the M pieces of first reference signal resource indication information to the base station.

In the foregoing method, the UE feeds back the CSI of the M first reference signal resources in a horizontal dimension and the M pieces of first reference signal resource indication information to the base station, so that the base station determines channel state information in a vertical dimension based on the first reference signal resource indication information and finally obtains the channel state information in the two dimensions. This overcomes a disadvantage that only channel state information in a horizontal dimension is fed back in conventional channel estimation.

In a feasible design, the feedback mode includes a first feedback mode; and the determining, by the UE, a channel state indication CSI and M pieces of first reference signal resource indication information based on a feedback mode includes: determining, by the UE in the first feedback mode, at least one element in the CSI based on the N first reference signal resources, and determining the M pieces of first reference signal resource indication information based on the at least one element in the CSI.

In a feasible design, the at least one element in the CSI is an RI that is recently reported before the UE determines the M pieces of first reference signal resource indication information, and the determining, by the UE in the first feedback mode, at least one element in the CSI based on the N first reference signal resources, and determining the M pieces of first reference signal resource indication information based on the at least one element in the CSI includes: determining, by the UE in the first feedback mode, the recently reported RI based on the N first reference signal resources, and determining the M pieces of first reference signal resource indication information based on the recently reported RI.

In a feasible design, after the determining, by the UE in the first feedback mode, the recently reported RI based on the N first reference signal resources, and determining the M pieces of first reference signal resource indication information based on the recently reported RI, the method further includes: determining, by the UE, M second reference signal resources based on an association relationship, where the association relationship is an association relationship between the M first reference signal resources and the M second reference signal resources; determining, by the UE, at least one of the PMI, the CQI, the channel covariance matrix, or the channel eigenvector based on the recently reported RI and the M second reference signal resources; and reporting, by the UE, the at least one of the PMI, the CQI, the channel covariance matrix, or the channel eigenvector to the base station.

In a feasible design, a feedback period of the RI is a first feedback period, a feedback period of the M pieces of first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

In a feasible design, the determining, by the UE in the first feedback mode, the recently reported RI based on the N first reference signal resources, and determining the M pieces of first reference signal resource indication information based on the recently reported RI includes: determining, by the UE in the first feedback mode, the recently reported RI based on the N first reference signal resources, and querying a correspondence table based on the recently reported RI to determine the M pieces of first reference signal resource indication information, where the correspondence table stores a correspondence that exists between the RI and M.

In a feasible design, the feedback mode includes a second feedback mode; and the determining, by the UE, a channel state indication CSI and M pieces of first reference signal resource indication information based on a feedback mode includes: determining, by the UE in the second feedback mode, the M pieces of first reference signal resource indication information based on the N first reference signal resources, and determining the CSI based on the M first reference signal resources indicated by the M pieces of first reference signal resource indication information.

In a feasible design, the M pieces of first reference signal resource indication information are M pieces of first reference signal resource indication information recently reported before the UE determines the CSI.

In a feasible design, the determining, by the UE in the second feedback mode, the M pieces of first reference signal resource indication information based on the N first reference signal resources, and determining the CSI based on the M first reference signal resources indicated by the M pieces of first reference signal resource indication information includes: determining, by the UE in the second feedback mode, the M pieces of first reference signal resource indication information based on the N first reference signal resources, and determining the RI in the CSI based on the M first reference signal resources indicated by the M pieces of first reference signal resource indication information.

In a feasible design, after the determining, by the UE in the second feedback mode, the M pieces of first reference signal resource indication information based on the N first reference signal resources, and determining the RI in the CSI based on the M first reference signal resources indicated by the M pieces of first reference signal resource indication information, the method further includes: determining, by the UE, M second reference signal resources based on an association relationship, where the association relationship is an association relationship between the M first reference signal resources and the M second reference signal resources; determining, by the UE, at least one of the PMI, the CQI, the channel covariance matrix, or the channel eigenvector in the CSI based on the M second reference signal resources and the RI; and reporting, by the UE, the at least one of the PMI, the CQI, the channel covariance matrix, or the channel eigenvector to the base station.

In a feasible design, a feedback period of the M pieces of first reference signal resource indication information is a fourth feedback period, a feedback period of the RI in the CSI is a fifth feedback period, a feedback period of the PMI and the CQI in the CSI is a sixth feedback period, the fourth feedback period is k3 times the fifth feedback period, the fifth feedback period is k4 times the sixth feedback period, k3 is an integer greater than or equal to 1, and k4 is an integer greater than or equal to 1.

In a feasible design, the reporting, by the UE, the at least one of the PMI or the CQI to the base station includes: determining, by the UE, M sets of CSI based on the recently reported RI and the M second reference signal resources, where each of the M sets of CSI includes at least one of a PMI, a CQI, a channel covariance matrix, or a channel eigenvector; combining, by the UE, the M sets of CSI into target CSI, where the target CSI includes at least one of a target PMI, a target CQI, a target channel covariance matrix, or a target channel eigenvector; and reporting, by the UE, a basis vector of the target PMI, a port index, or a combination coefficient to the base station, so that the base station determines the target PMI based on the basis vector of the target PMI, the port index, or the combination coefficient, and obtains the target CQI based on the target PMI.

In a feasible design, the method further includes: receiving, by the UE, the feedback mode configured by the base station by using higher layer signaling or dynamic signaling.

In a feasible design, the method further includes: feeding back, by the UE, the feedback mode to the base station.

According to a second aspect, this application provides a channel state information feedback method, including: configuring, by a base station, N first reference signal resources, where each of the N first reference signal resources includes at least one port, and N is an integer greater than or equal to 2; sending, by the base station, the N first reference signal resources to user equipment UE; and receiving, by the base station, a channel state indication CSI and M pieces of first reference signal resource indication information that are reported by the UE based on a feedback mode, where the feedback mode indicates a sequence of determining each element in the CSI and the M pieces of first reference signal resource indication information, and the CSI includes at least one of the following elements: a rank indicator RI, a precoding matrix indicator PMI, a channel quality indicator CQI, a channel covariance matrix, or a channel eigenvector, where the M pieces of first reference signal resource indication information indicate an index and/or quality information of each of M first reference signal resources, the M first reference signal resources are M first reference signal resources in the N first reference signal resources, and M is an integer less than or equal to N.

In a feasible design, the feedback mode includes a first feedback mode; and the receiving, by the base station, a channel state indication CSI and M pieces of first reference signal resource indication information that are reported by the UE based on a feedback mode includes: receiving, by the base station in the first feedback mode, the M pieces of first reference signal resource indication information determined by the UE based on at least one element in the CSI, where the at least one element in the CSI is determined by the UE based on the N first reference signal resources.

In a feasible design, the at least one element in the CSI is an RI that is recently reported before the UE determines the M pieces of first reference signal resource indication information, and the receiving, by the base station in the first feedback mode, the M pieces of first reference signal resource indication information determined by the UE based on at least one element in the CSI includes: receiving, by the base station in the first feedback mode, the M pieces of first reference signal resource indication information determined by the UE based on the recently reported RI, where the recently reported RI is determined by the UE based on the N first reference signal resources.

In a feasible design, after the receiving, by the base station in the first feedback mode, the M pieces of first reference signal resource indication information determined by the UE based on the recently reported RI, the method further includes: receiving, by the base station, at least one of the PMI, the CQI, the channel covariance matrix, or the channel eigenvector that is reported by the UE, where the at least one of the PMI, the CQI, the channel covariance matrix, or the channel eigenvector is determined by the UE based on the recently reported RI and M second reference signal resources, the M second reference signal resources are determined based on an association relationship, and the association relationship is an association relationship between the M first reference signal resources and the M second reference signal resources.

In a feasible design, a feedback period of the RI is a first feedback period, a feedback period of the M pieces of first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

In a feasible design, the M pieces of first reference signal resource indication information are determined by the UE by determining the recently reported RI based on the N first reference signal resources, and querying a correspondence table based on the recently reported RI, where the correspondence table stores a correspondence that exists between the RI and M.

In a feasible design, the feedback mode includes a second feedback mode; and the receiving, by the base station, a channel state indication CSI and M pieces of first reference signal resource indication information that are reported by the UE based on a feedback mode includes: receiving, by the base station in the second feedback mode, the CSI determined by the UE based on the M pieces of first reference signal resource indication information, where the M pieces of first reference signal resource indication information are determined by the UE based on the N first reference signal resources.

In a feasible design, the M pieces of first reference signal resource indication information are M pieces of first reference signal resource indication information recently reported before the UE determines the CSI.

In a feasible design, the receiving, by the base station in the second feedback mode, the CSI determined by the UE based on the M pieces of first reference signal resource indication information includes: receiving, by the base station, the RI determined by the UE based on the M first reference signal resources.

In a feasible design, after the receiving, by the base station, the RI determined by the UE based on the M first reference signal resources, the method further includes: receiving, by the base station, at least one of the PMI, the CQI, the channel covariance matrix, or the channel eigenvector that is reported by the UE, where the at least one of the PMI, the CQI, the channel covariance matrix, or the channel eigenvector is determined by the UE based on M second reference signal resources, the M second reference signal resources are determined by the UE based on an association relationship, and the association relationship is an association relationship between the M first reference signal resources and the M second reference signal resources.

In a feasible design, a feedback period of the M pieces of first reference signal resource indication information is a fourth feedback period, a feedback period of the RI in the CSI is a fifth feedback period, a feedback period of the PMI and the CQI in the CSI is a sixth feedback period, the fourth feedback period is k3 times the fifth feedback period, the fifth feedback period is k4 times the sixth feedback period, k3 is an integer greater than or equal to 1, and k4 is an integer greater than or equal to 1.

In a feasible design, the receiving, by the base station, at least one of the PMI, the CQI, the channel covariance matrix, or the channel eigenvector that is reported by the UE includes: receiving, by the base station, target CSI reported by the UE, where the target CSI includes at least one of a target PMI, a target CQI, a target channel covariance matrix, or a target channel eigenvector, the target CSI is obtained by the UE by combining M sets of CSI, and the M sets of CSI are determined by the UE based on the recently reported RI and the M second reference signal resources.

In a feasible design, the method further includes: sending, by the base station, higher layer signaling or dynamic information to the UE, where the higher layer signaling or dynamic signaling carries the feedback mode.

In a feasible design, the method further includes: subsequently receiving the feedback mode fed back by the UE.

According to a third aspect, this application provides user equipment, including: a receiving module, configured to receive N first reference signal resources configured by a base station, where each of the N first reference signal resources includes at least one port, and N is an integer greater than or equal to 2; a processing module, configured to determine a channel state indication CSI and M pieces of first reference signal resource indication information based on a feedback mode, where the feedback mode indicates a sequence of determining each element in the CSI and the M pieces of first reference signal resource indication information, and the CSI includes at least one of the following elements: a rank indicator RI, a precoding matrix indicator PMI, a channel quality indicator CQI, a channel covariance matrix, or a channel eigenvector; and a sending module, configured to report the CSI and the M pieces of first reference signal resource indication information to the base station, where the M pieces of first reference signal resource indication information indicate an index and/or quality information of each of M first reference signal resources, the M first reference signal resources are M first reference signal resources in the N first reference signal resources, and M is an integer less than or equal to N.

In a feasible design, the feedback mode includes a first feedback mode; and the processing module is specifically configured to determine, in the first feedback mode, at least one element in the CSI based on the N first reference signal resources, and determine the M pieces of first reference signal resource indication information based on the at least one element in the CSI.

In a feasible design, the at least one element in the CSI is an RI that is recently reported before the UE determines the M pieces of first reference signal resource indication information, and the processing module is specifically configured to determine, in the first feedback mode, the recently reported RI based on the N first reference signal resources, and determine the M pieces of first reference signal resource indication information based on the recently reported RI.

In a feasible design, the processing module is further configured to: determine M second reference signal resources based on an association relationship, where the association relationship is an association relationship between the M first reference signal resources and the M second reference signal resources; and determine at least one of the PMI, the CQI, the channel covariance matrix, or the channel eigenvector based on the recently reported RI and the M second reference signal resources; and the sending module is further configured to report the at least one of the PMI, the CQI, the channel covariance matrix, or the channel eigenvector to the base station.

In a feasible design, a feedback period of the RI is a first feedback period, a feedback period of the M pieces of first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

In a feasible design, when determining the recently reported RI based on the N first reference signal resources, and determining the M pieces of first reference signal resource indication information based on the recently reported RI, the processing module is specifically configured to determine, in the first feedback mode, the recently reported RI based on the N first reference signal resources, and query a correspondence table based on the recently reported RI to determine the M pieces of first reference signal resource indication information, where the correspondence table stores a correspondence that exists between the RI and M.

In a feasible design, the feedback mode includes a second feedback mode; and the processing module is specifically configured to determine, by the UE in the second feedback mode, the M pieces of first reference signal resource indication information based on the N first reference signal resources, and determine the CSI based on the M first reference signal resources indicated by the M pieces of first reference signal resource indication information.

In a feasible design, the M pieces of first reference signal resource indication information are M pieces of first reference signal resource indication information recently reported before the UE determines the CSI.

In a feasible design, the processing module is specifically configured to determine, in the second feedback mode, the M pieces of first reference signal resource indication information based on the N first reference signal resources, and determine the RI in the CSI based on the M first reference signal resources indicated by the M pieces of first reference signal resource indication information.

In a feasible design, after determining, in the second feedback mode, the M pieces of first reference signal resource indication information based on the N first reference signal resources, and determining the RI in the CSI based on the M first reference signal resources indicated by the M pieces of first reference signal resource indication information, the processing module is further configured to: determine M second reference signal resources based on an association relationship, where the association relationship is an association relationship between the M first reference signal resources and the M second reference signal resources; and determine at least one of the PMI, the CQI, the channel covariance matrix, or the channel eigenvector in the CSI based on the M second reference signal resources and the RI; and the sending module is further configured to report the at least one of the PMI, the CQI, the channel covariance matrix, or the channel eigenvector to the base station.

In a feasible design, a feedback period of the M pieces of first reference signal resource indication information is a fourth feedback period, a feedback period of the RI in the CSI is a fifth feedback period, a feedback period of the PMI and the CQI in the CSI is a sixth feedback period, the fourth feedback period is k3 times the fifth feedback period, the fifth feedback period is k4 times the sixth feedback period, k3 is an integer greater than or equal to 1, and k4 is an integer greater than or equal to 1.

In a feasible design, the processing module is further configured to: determine M sets of CSI based on the recently reported RI and the M second reference signal resources, where each of the M sets of CSI includes at least one of a PMI, a CQI, a channel covariance matrix, or a channel eigenvector; and combine the M sets of CSI into target CSI, where the target CSI includes at least one of a target PMI, a target CQI, a target channel covariance matrix, or a target channel eigenvector; and the sending module is specifically configured to report a basis vector of the target PMI, a port index, or a combination coefficient to the base station, so that the base station determines the target PMI based on the basis vector of the target PMI, the port index, or the combination coefficient, and obtains the target CQI based on the target PMI.

In a feasible design, the receiving module is further configured to receive the feedback mode configured by the base station by using higher layer signaling or dynamic signaling.

In a feasible design, the sending module is further configured to feed back the feedback mode to the base station.

According to a fourth aspect, this application provides a base station, including: a processing module, configured to configure N first reference signal resources, where each of the N first reference signal resources includes at least one port, and N is an integer greater than or equal to 2; a sending module, configured to send the N first reference signal resources to user equipment UE; and a receiving module, configured to receive a channel state indication CSI and M pieces of first reference signal resource indication information that are reported by the UE based on a feedback mode, where the feedback mode indicates a sequence of determining each element in the CSI and the M pieces of first reference signal resource indication information, and the CSI includes at least one of the following elements: a rank indicator RI, a precoding matrix indicator PMI, a channel quality indicator CQI, a channel covariance matrix, or a channel eigenvector, where the M pieces of first reference signal resource indication information indicate an index and/or quality information of each of M first reference signal resources, the M first reference signal resources are M first reference signal resources in the N first reference signal resources, and M is an integer less than or equal to N.

In a feasible design, the feedback mode includes a first feedback mode; and the receiving module is specifically configured to receive, in the first feedback mode, the M pieces of first reference signal resource indication information determined by the UE based on at least one element in the CSI, where the at least one element in the CSI is determined by the UE based on the N first reference signal resources.

In a feasible design, the at least one element in the CSI is an RI that is recently reported before the UE determines the M pieces of first reference signal resource indication information, and the receiving module is specifically configured to receive, in the first feedback mode, the M pieces of first reference signal resource indication information determined by the UE based on the recently reported RI, where the recently reported RI is determined by the UE based on the N first reference signal resources.

In a feasible design, after receiving, in the first feedback mode, the M pieces of first reference signal resource indication information determined by the UE based on the recently reported RI, the receiving module is further configured to receive at least one of the PMI, the CQI, the channel covariance matrix, or the channel eigenvector that is reported by the UE, where the at least one of the PMI, the CQI, the channel covariance matrix, or the channel eigenvector is determined by the UE based on the recently reported RI and M second reference signal resources, the M second reference signal resources are determined based on an association relationship, and the association relationship is an association relationship between the M first reference signal resources and the M second reference signal resources.

In a feasible design, a feedback period of the RI is a first feedback period, a feedback period of the M pieces of first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

In a feasible design, the M pieces of first reference signal resource indication information are determined by the UE by determining the recently reported RI based on the N first reference signal resources, and querying a correspondence table based on the recently reported RI, where the correspondence table stores a correspondence that exists between the RI and M.

In a feasible design, the feedback mode includes a second feedback mode; and the receiving module is specifically configured to receive, in the second feedback mode, the CSI determined by the UE based on the M pieces of first reference signal resource indication information, where the M pieces of first reference signal resource indication information are determined by the UE based on the N first reference signal resources.

In a feasible design, the M pieces of first reference signal resource indication information are M pieces of first reference signal resource indication information recently reported before the UE determines the CSI.

In a feasible design, the receiving module is specifically configured to receive, in the second feedback mode, the RI determined by the UE based on the M first reference signal resources.

In a feasible design, after receiving the RI determined by the UE based on the M first reference signal resources, the receiving module is further configured to receive at least one of the PMI, the CQI, the channel covariance matrix, or the channel eigenvector that is reported by the UE, where the at least one of the PMI, the CQI, the channel covariance matrix, or the channel eigenvector is determined by the UE based on M second reference signal resources, the M second reference signal resources are determined by the UE based on an association relationship, and the association relationship is an association relationship between the M first reference signal resources and the M second reference signal resources.

In a feasible design, a feedback period of the M pieces of first reference signal resource indication information is a fourth feedback period, a feedback period of the RI in the CSI is a fifth feedback period, a feedback period of the PMI and the CQI in the CSI is a sixth feedback period, the fourth feedback period is k3 times the fifth feedback period, the fifth feedback period is k4 times the sixth feedback period, k3 is an integer greater than or equal to 1, and k4 is an integer greater than or equal to 1.

In a feasible design, the receiving module is specifically configured to receive target CSI reported by the UE, where the target CSI includes at least one of a target PMI, a target CQI, a target channel covariance matrix, or a target channel eigenvector, the target CSI is obtained by the UE by combining M sets of CSI, and the M sets of CSI are determined by the UE based on the recently reported RI and the M second reference signal resources.

In a feasible design, the sending module is further configured to send higher layer signaling or dynamic information to the UE, where the higher layer signaling or dynamic signaling carries the feedback mode.

In a feasible design, the receiving module is further configured to receive the feedback mode fed back by the UE.

According to a fifth aspect, this application provides user equipment, including a processor, a memory, a communications interface, and a system bus, where the memory and the communications interface are connected to and communicate with the processor by using the system bus; the memory is configured to store a computer-executable instruction, and the communications interface is configured to communicate with another device; and the processor is configured to run the computer-executable instruction, so that the user equipment performs each step of the method applied to the user equipment.

According to a sixth aspect, this application provides a base station, including a processor, a memory, a communications interface, and a system bus, where the memory and the communications interface are connected to and communicate with the processor by using the system bus; the memory is configured to store a computer-executable instruction; the communications interface is configured to communicate with another device; and the processor is configured to run the computer-executable instruction, so that the base station performs each step of the method applied to the base station.

According to a seventh aspect, this application provides a computer storage medium, configured to store a computer software instruction used by the foregoing user equipment, where the computer software instruction includes a program designed for performing the first aspect or each feasible implementation of the first aspect.

According to an eighth aspect, this application provides a computer storage medium, configured to store a computer software instruction used by the foregoing base station, where the computer software instruction includes a program designed for performing the second aspect or each feasible implementation of the second aspect.

According to a ninth aspect, this application provides a chip system, including at least one processor, a memory, an input/output part, and a bus, where the at least one processor obtains an instruction in the memory by using the bus, to implement a designed function of the user equipment in the foregoing method.

According to a tenth aspect, this application provides a chip system, including at least one processor, a memory, an input/output part, and a bus, where the at least one processor obtains an instruction in the memory by using the bus, to implement a designed function of the base station in the foregoing method.

According to an eleventh aspect, this application provides user equipment, including a memory and a processor, where the memory is configured to store a program instruction, and the processor is configured to invoke the program instruction in the memory to implement a function of the user equipment in the foregoing method embodiment.

According to a twelfth aspect, this application provides a base station, including a memory and a processor, where the memory is configured to store a program instruction, and the processor is configured to invoke the program instruction in the memory to implement a function of the base station in the foregoing method embodiment.

According to the channel state information feedback method, the user equipment, and the base station provided by this application, the base station configures the N first reference signal resources for the UE, and sends the N first reference signal resources to the UE. After receiving the first reference signal resources, and then determining the CSI of the first reference signal resources and the M pieces of first reference signal indication information based on the feedback mode, the UE feeds back the CSI and the M pieces of first reference signal resource indication information to the base station. In this process, the UE feeds back the CSI of the M first reference signal resources in the horizontal dimension and the M pieces of first reference signal resource indication information to the base station, so that the base station determines the channel state information in the vertical dimension based on the first reference signal resource indication information and finally obtains the channel state information in the two dimensions. This overcomes the disadvantage that only the channel state information in the horizontal dimension is fed back in conventional channel estimation.

DETAILED DESCRIPTION OF ILLUSTRATIVE EMBODIMENTS

Figure 1:
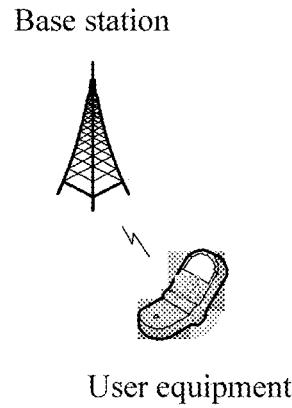
FIG. 1 is a schematic diagram of a system architecture to which a channel state information feedback method is applicable according to this application.

FIG. 1 is a schematic diagram of a system architecture to which a channel state information feedback method is applicable according to this application. Referring to FIG. 1, in the system architecture, there are at least one base station and at least one user equipment. A communication connection is established between the base station and the user equipment. The base station may be a base transceiver station (BTS) in a global system for mobile communications (GSM) or wideband code division multiple access (WCDMA), or may be a base station (NodeB) in WCDMA, or may be an evolved NodeB (evolutional NodeB, eNB) in long term evolution (LTE), or may be a base station in the 5th generation mobile communication (5G). This is not limited in this application.

The UE may be a wired terminal or a wireless terminal. The wireless terminal may be a device that provides a user with voice and/or data connectivity, a handheld device with a wireless connection function, or another processing device connected to a wireless modem. The wireless terminal may communicate with one or more core networks through a radio access network. The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For another example, it may be a device such as a personal communications service (PCS) phone, a cordless telephone set, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device, or user equipment, or the like.

Figure 2:
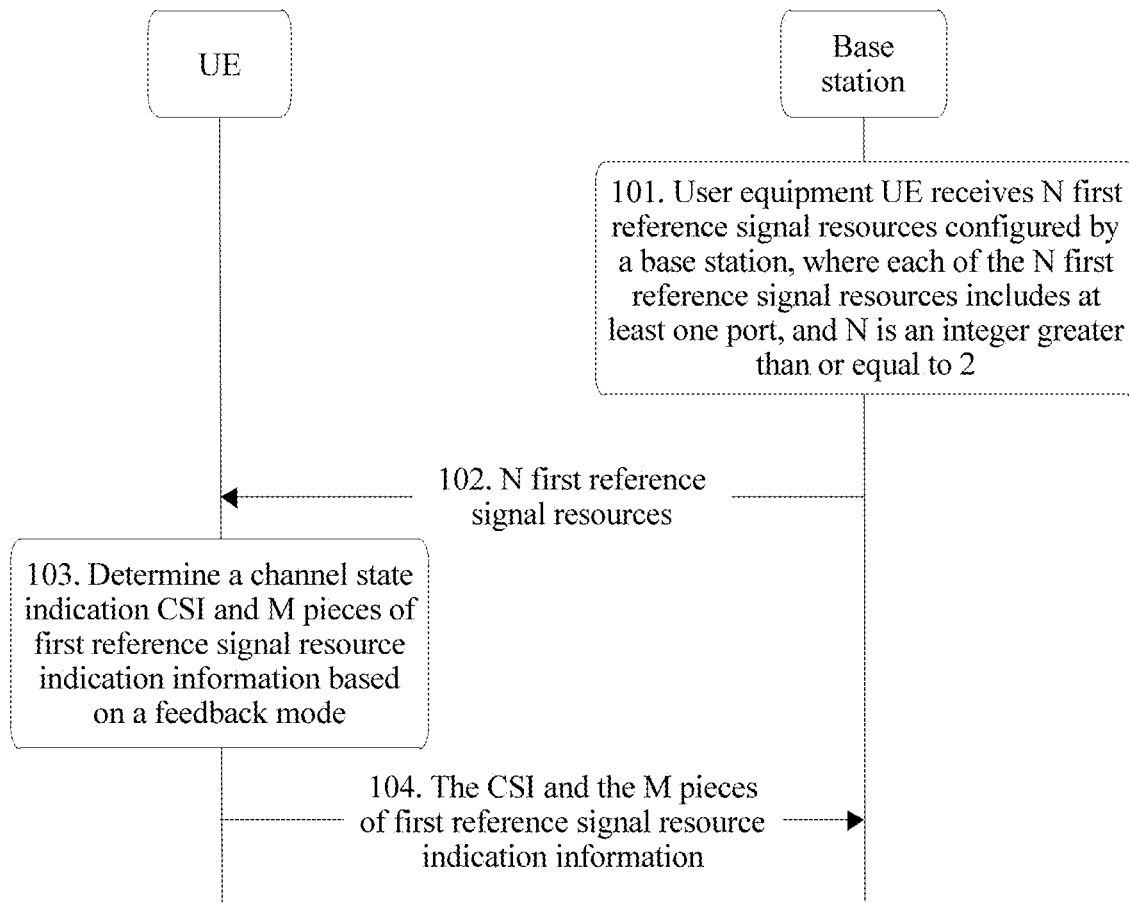
FIG. 2 is a signaling diagram of a redundancy version generation method according to this application.

FIG. 2 is a signaling diagram of a redundancy version generation method according to this application. This embodiment includes the following steps.

101. User equipment UE receives N first reference signal resources configured by a base station, where each of the N first reference signal resources includes at least one port, and N is an integer greater than or equal to 2.

In this step, the base station configures the N first reference signal resources for the UE, for example, N channel state information-reference signal (CSI-RS) resources.

102. The base station sends the N first reference signal resources to the user equipment UE.

After configuring the N reference signal resources, the base station sends the N reference signal resources to the UE; and correspondingly, the UE receives the N reference signal resources configured by the base station.

103. The UE determines a channel state indication CSI and M pieces of first reference signal resource indication information based on a feedback mode.

After receiving the N first reference signal resources, the UE determines the channel state indication (CSI) of the N first reference signal resources and the M pieces of first reference signal resource indication information based on the feedback mode, where the M pieces of first reference signal resource indication information indicate an index and/or quality information of each of M first reference signal resources, the M first reference signal resources are M first reference signal resources in the N first reference signal resources, and M is an integer less than or equal to N. For example, the N first reference signals are specifically 10 first reference signal resources whose indexes are 1 to 10 respectively, the M first reference signal resources are a first reference signal resource numbered 1 and a first reference signal resource numbered 3 in the 10 first reference signal resources, quality of the first reference signal resource numbered 1 is 10 decibels (dB), and quality of the first reference signal resource numbered 3 is 8 dB. In this case, the M pieces of first reference signal resource indication information include a first piece of reference signal resource indication information and a third piece of reference signal resource indication information, where the first piece of reference signal resource indication information is used to indicate the first reference signal resource whose index is 1 and whose quality is 10 dB, and the third piece of reference signal resource indication information is used to indicate the first reference signal resource whose index is 3 and whose quality is 8 dB.

The CSI includes at least one of the following elements: a channel quality indicator (CQI), a precoding matrix indicator (PMI), a rank indicator (RI), a channel covariance matrix, a channel eigenvector, and the like. The feedback mode indicates a sequence of determining each element in the CSI and the M pieces of first reference signal resource indication information. In a specific implementation, depending on different feedback modes, the sequence of determining each element in the CSI and the M pieces of first reference signal resource indication information varies. For example, when an angle of a channel on a base station side is relatively large, the UE first determines the RI in the CSI based on the N measurement reference signal resources, then determines the M pieces of first reference signal resource indication information based on the RI, and then determines at least one of the PMI, the CQI, the channel covariance matrix, and the channel eigenvector based on the RI and the M pieces of first reference signal resource indication information. For another example, when an angle of a channel on a base station side is relatively small, the UE first determines the M pieces of first reference signal resource indication information based on the N first reference signal resources, then determines the RI in the CSI based on the M first reference signal resources indicated by the M pieces of first reference signal resource indication information, and then determines at least one of the PMI, the CQI, the channel covariance matrix, and the channel eigenvector based on the determined RI and the M first reference signal resources indicated by the M pieces of first reference signal resource indication information. For another example, the UE first determines all elements in the CSI, and then determines the M pieces of first reference signal resource indication information based on all the elements. For another example, the UE first determines the M pieces of first reference signal resource indication information, and then determines all elements in the CSI based on the M first reference signal resources indicated by the M pieces of first reference signal resource indication information.

104. The UE reports the CSI and the M pieces of first reference signal resource indication information to the base station.

After determining the CSI and the M pieces of reference signal resource indication information, the UE feeds back the CSI and the M reference signal resources to the base station.

In the channel state information feedback method provided by this application, the base station configures the N first reference signal resources for the UE, and sends the N first reference signal resources to the UE. After receiving the first reference signal resources, and then determining the CSI of the first reference signal resources and the M pieces of first reference signal indication information based on the feedback mode, the UE feeds back the CSI and the M pieces of first reference signal resource indication information to the base station. In this process, the UE feeds back the CSI of the M first reference signal resources in a horizontal dimension and the M pieces of first reference signal resource indication information to the base station, so that the base station determines channel state information in a vertical dimension based on the first reference signal resource indication information and finally obtains the channel state information in the two dimensions. This overcomes a disadvantage that only channel state information in a horizontal dimension is fed back in conventional channel estimation.

Optionally, the feedback mode includes a first feedback mode or a second feedback mode; in the first feedback mode, the UE determines the M pieces of first reference signal resource indication information based on at least one element in the CSI; in the second feedback mode, the UE determines the CSI based on the M pieces of first reference signal resource indication information. The following describes the first feedback mode and the second feedback mode separately in detail.

First, the first feedback mode.

In the first feedback mode the UE determines at least one element in the CSI based on the N first reference signal resources, and determines the M pieces of first reference signal resource indication information based on the at least one element in the CSI, where the at least one element is, for example, the RI, the PMI, the CQI, the channel covariance matrix, and the channel eigenvector. The following describes the first feedback mode in detail by using an example in which the at least one element is specifically an RI that is recently reported before the UE determines the M pieces of first reference signal resource indication information. Specifically, FIG. 3A is a schematic diagram of Embodiment 2 of a channel state information feedback method according to this application.

Figure 3A:
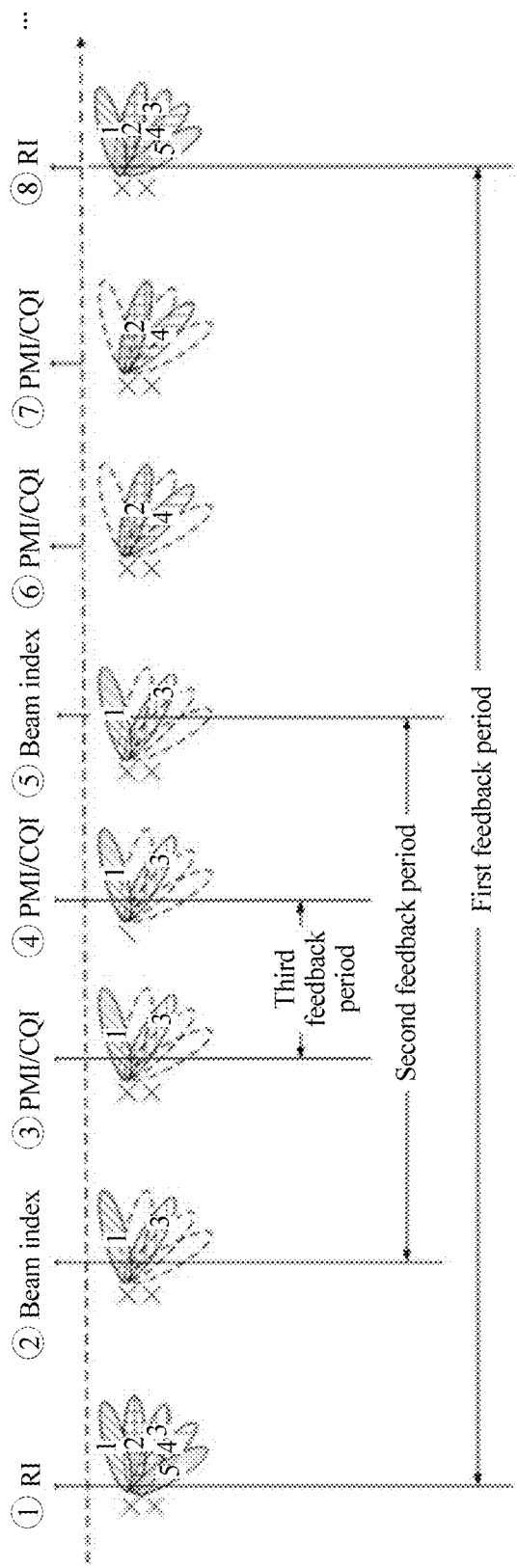
FIG. 3A is a schematic diagram of Embodiment 2 of a channel state information feedback method according to this application.

Referring to FIG. 3A, an AAS antenna array is, for example, a 2×2 antenna array (as shown by $\overset{\times}{\times}$ in the figure), and beamforming may be performed in both the horizontal dimension and the vertical dimension. In beamforming in the vertical dimension, the AAS antenna array may form different beams (beam) in the vertical dimension. Indexes of the N first reference signal resources configured by the base station are 1 to 5 sequentially, and the five first reference signal resources are shown by 1 to 5 filled with slashes, grids, horizontal lines, vertical lines, and points in the figure. Each reference signal resource corresponds to one resource port (port), different first reference signal resources correspond to beams in different directions, and different beams have different beam identifiers (Beam ID). To be specific, an index indicated by each piece of first reference signal resource indication information corresponds to a unique beam ID. In the first feedback mode, the UE determines the recently reported RI based on the N first reference signal resources, and queries a correspondence table based on the recently reported RI to determine the M pieces of first reference signal resource indication information, where the correspondence table stores a correspondence that exists between the RI and M. For example, if the RI is 1 to 2, M is 2; or if the RI is 3 to 4, M is 4.

In the first feedback mode, assuming that the M pieces of first reference signal resource indication information are M beam identifiers (Beam ID) corresponding to M indexes, and that CSI recently reported before the UE determines the M pieces of first reference signal resource indication information is an RI, as shown by "①  RI" in the figure, the UE determines "②  Beam ID" based on "①  RI", where "②  Beam ID" is beam identifiers of beams corresponding to the index 1 and the index 3. If the CSI recently reported after the UE determines "②  Beam ID" is that the RI has not changed, when the UE determines "⑤  Beam ID", "⑤  Beam ID" is still determined based on "①  RI". However, if the UE determines the M pieces of reference signal resource indication information based on the PMI and/or the CQI in the CSI, when the UE determines "⑤ Beam ID", "⑤ Beam ID" is determined based on "④ PMI/CQI".

Further, in the first feedback mode, after the UE determines the recently reported RI based on the N first reference signal resources, and determines the M pieces of first reference signal resource indication information based on the recently reported RI, the UE may further determine M second reference signal resources based on an association relationship, and determine at least one of the PMI, the CQI, the channel covariance matrix, or the channel eigenvector based on the recently reported RI and the M second reference signal resources; and then the UE reports the at least one of the PMI, the CQI, the channel covariance matrix, or the channel eigenvector to the base station. The association relationship is an association relationship between the M first reference signal resources and the M second reference signal resources.

Specifically, still referring to FIG. 3A, and using determining of the PMI/CQI as an example, the UE determines the M second reference signal resources based on "② Beam ID" and the association relationship after determining "② Beam ID" based on "① RI", where the M second reference signal resources are not shown in the figure, determines at least one of the PMI, the CQI, the channel covariance matrix, or the channel eigenvector based on the M second reference signal resources, and then reports the at least one to the base station. For example, each of the N first reference signal resources includes two ports, where directions of beams corresponding to the two ports are the same, the N first reference signal resources correspond to beams $B_1$ to $B_{10}$ respectively, indexes (Index) corresponding to the N first reference signal resources are an index 1 to an index 10 respectively, and the M first reference signal resources are first reference signal resources whose indexes are the index 1 and the index 3. The association relationship indicates that a first reference signal resource and a second reference signal resource respectively belong to different reference signal resource sets, and a correspondence exists between indexes of the first reference signal resource and the second reference signal resource. For example, an index of the first reference signal resource is the same as an index of the second reference signal resource, or an index of the second reference signal resource is obtained by offsetting an index of the first reference signal resource by one value.

For example, the index of the first reference signal resource is the same as the index of the second reference signal resource. Assume that there are 10 second reference signal resources, corresponding to the beams $B_1$ to $B_{10}$, and indexes thereof are an index 1' to an index 10' respectively, and each second reference signal resource has eight ports. In this case, after the UE determines, based on the recently reported RI, that the M first reference signal resources are the first reference signal resources whose indexes are the index 1 and the index 3, the UE determines, based on the association relationship, M second reference signal resources whose indexes are the index 1' and the index 3', and determines at least one of the PMI, the CQI, the channel covariance matrix, or the channel eigenvector based on the second reference signal resources whose indexes are the index 1' and the index 3'.

Still referring to FIG. 3A, a feedback period of the RI is a first feedback period, a feedback period of the first reference signal resource indication information (that is, the beam ID) is a second feedback period, a feedback period of the PMI/CQI is a third feedback period, the first feedback period is k1 times the second feedback period, the second feedback period is k2 times the third feedback period, k1 is an integer greater than or equal to 1, and k2 is an integer greater than or equal to 1.

Second, the second feedback mode.

In the second feedback mode, the UE determines the M pieces of first reference signal resource indication information based on the N first reference signal resources, and determines the CSI based on the M pieces of first reference signal resource indication information, where the CSI is, for example, the RI, the PMI, the CQI, the channel covariance matrix, and the channel eigenvector. The following describes the second feedback mode in detail by using an example in which the UE determines the M pieces of first reference signal resource indication information based on the N first reference signal resources, and determines the RI based on the M pieces of first reference signal resource indication information. Specifically, FIG. 3B is another schematic diagram of Embodiment 2 of a channel state information feedback method according to this application.

Figure 3B:
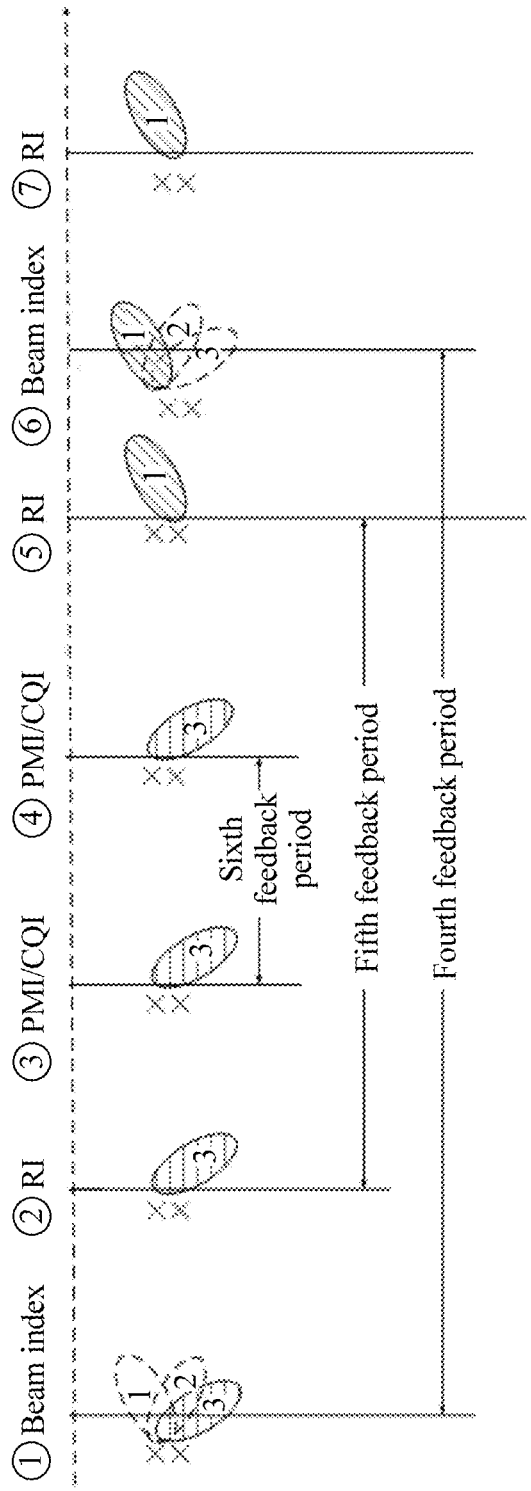
FIG. 3B is another schematic diagram of Embodiment 2 of a channel state information feedback method according to this application.

Referring to FIG. 3B, an AAS antenna array is, for example, a 2×2 antenna array (as shown by $\overset{\times}{\times}$ in the figure), and beamforming may be performed in both the horizontal dimension and the vertical dimension. In beamforming in the vertical dimension, the AAS antenna array may form different beams (beam) in the vertical dimension. The UE recently reports three pieces of first reference signal resource indication information, where indexes of the three pieces of first reference signal resource indication information indicate reference signal resources whose indexes are 1 to 3 sequentially, and the three first reference signal resources are shown by 1 to 3 filled with slashes, grids, and horizontal lines in the figure. Each first reference signal resource corresponds to one resource port, different first reference signal resources correspond to beams in different directions, and different beams have different beam identifiers (Beam ID). To be specific, an index indicated by each piece of first reference signal resource indication information corresponds to a unique beam ID.

In the second feedback mode, assuming that the CSI is specifically the RI, and that M pieces of first reference signal resource indication information recently reported before the UE determines the RI are "① Beam ID", where "① Beam ID" is a beam identifier corresponding to a port whose index is 3, the UE determines "② RI" based on "① Beam ID". If the beam ID reported by the UE after the UE determines "② RI" has not changed, the UE still determines "⑤ RI" based on "① Beam ID" when determining "⑤ RI".

Further, in the second feedback mode, after determining the M pieces of first reference signal resource indication information based on the N first reference signal resources, and determining the RI in the CSI based on the M first reference signal resources indicated by the M pieces of first reference signal resource indication information, the UE may further determine M second reference signal resources based on an association relationship, where the association relationship is an association relationship between the M first reference signal resources and the M second reference signal resources; and the UE determines at least one of the PMI, the CQI, the channel covariance matrix, or the channel eigenvector in the CSI based on the M second reference signal resources and the RI. For details, refer to the descriptions about FIG. 3A. Details are not described again herein.

Still referring to FIG. 3B, a feedback period of the M pieces of reference signal resource indication information, that is, the beam ID, is a fourth feedback period, a feedback period of the RI is a fifth feedback period, a feedback period of the PMI/CQI is a sixth feedback period, the fourth feedback period is k3 times the fifth feedback period, the fifth feedback period is k4 times the sixth feedback period, k3 is an integer greater than or equal to 1, and k4 is an integer greater than or equal to 1.

Figure 4A:
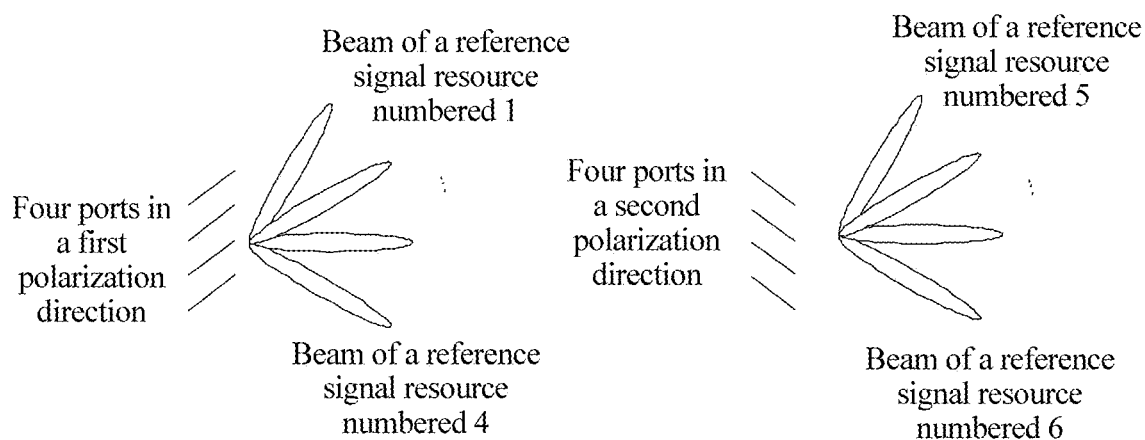
FIG. 4A is a schematic diagram of a manner of sending a reference signal resource in a channel state information feedback method according to this application.
Figure 4B:
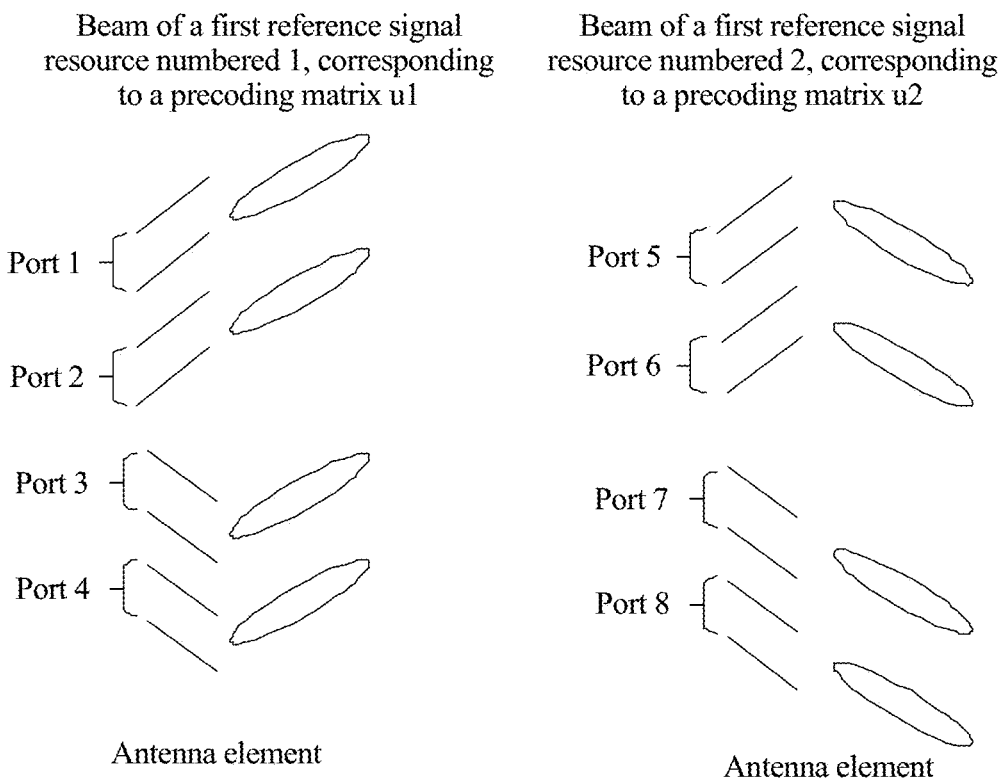
FIG. 4B is another schematic diagram of a manner of sending a reference signal resource in a channel state information feedback method according to this application.

The following describes the foregoing channel state information feedback methods in detail by using two specific scenarios. Specifically, refer to FIG. 4A and FIG. 4B. FIG. 4A is a schematic diagram of a manner of sending a reference signal resource in a channel state information feedback method according to this application. FIG. 4B is another schematic diagram of a manner of sending a reference signal resource in a channel state information feedback method according to this application.

Scenario 1

Refer to FIG. 4A.

UE measures N reference signal resources sent by a base station, where the N reference signal resources are sent by using N ports. A reference signal resource is a reference signal sent on a port. N/2 reference signal resources are sent by using N/2 antenna ports in a first polarization direction, and other N/2 reference signal resources are sent by N/2 antenna ports in a second polarization direction. A reference signal of each port is precoded by using a precoding matrix, and one precoding matrix corresponds to one beam. Therefore, it may be considered that the reference signal of each port is sent by using a corresponding beam. As shown in FIG. 4, the base station sends N=8 reference signal resources, where N/2=4 reference signal resources are sent by using ports in the first polarization direction, and N/2=4 reference signal resources are sent by using ports in the second polarization direction. There may be a plurality of forms of precoding vectors, for example, discrete Fourier transform (Discrete Fourier Transform, DFT) vectors. The base station determines N reference signals (such as CSI-RSs) $s_1, \ldots, s_m$, where the N CSI-RSs may be predefined, and are known by the base station and the terminal device. The base station multiplies N precoding matrices by the N reference signals respectively to obtain N precoded reference signals: $s_1'=u_1 \times s_1, \ldots, sN'=uN \times sN$, where $ui(i=1, \ldots, N)$ is a precoding matrix of an $i^{th}$ port.

Optionally, the UE may autonomously select a feedback mode by measuring the reference signals, and report the feedback mode to the base station. Optionally, the base station may notify, by using higher layer (RRC) signaling or dynamic signaling (DCI), the UE of a feedback mode that should be used. The UE measures the reference signals, and determines a set of channel state information CSI of the UE based on the selected feedback mode or the feedback mode configured by the base station. One set of CSI includes at least one of the following elements in the feedback mode: a rank indicator RI, a precoding matrix indicator PMI, and a channel quality indicator CQI. The PMI may be a wideband PMI or may be a plurality of subband PMIs.

The feedback mode includes a first feedback mode and a second feedback mode. In the first feedback mode, the UE first determines at least one element in the CSI based on measurements of the N reference signals, and determines M pieces of reference signal resource indication information based on the at least one element in the CSI. M is a positive integer less than or equal to N. In the M pieces of reference signal resource indication information, each reference signal resource indication is used to indicate an index of one reference signal resource, and/or indicate quality information of the reference signal resource, for example, received power (RSRP) or received quality (RSRQ). In the second feedback mode, the UE first determines M pieces of reference signal resource indication information based on measurements of the N reference signals, and determines each element in the CSI based on the M pieces of reference signal resource indication information.

The UE may determine the feedback mode in a plurality of manners. For example, the UE may obtain reference signal received power of the N ports by measuring the reference signals of the N ports. When the UE determines that there is more than one reference signal whose received power exceeds a predetermined threshold in the N/2 reference signals in each polarization direction, the UE may determine to use the first feedback mode to report the CSI. Otherwise, if the UE determines that there is only one reference signal whose received power exceeds a predetermined threshold in the N/2 reference signals in each polarization direction, the UE may determine to use the second feedback mode to report the CSI. The UE may further determine the feedback mode in other manners, and such manners are not excluded herein.

If the first feedback mode is used, the UE first determines to report the RI based on results of measuring the reference signals. The RI represents a quantity of layers of data that the UE instructs the base station to transmit on a same time-frequency resource in a subsequent data transmission process. After determining the RI, the UE reports M reference signal resource indications based on the RI, where each reference signal resource indication is used to indicate a number of a reference signal resource and/or quality information of the reference signal resource. A method for reporting the M indications may be reporting beam numbers or port numbers or the like. A time of reporting the M reference signal resource indications by the UE may be different from a time of reporting the RI. When the time of reporting the M reference signal resource indications is later than the time of reporting the RI, the RI based on which the M reference signal resource indications are reported is an RI that is recently reported before the current reporting time. Optionally, a value of M may be configured by the base station for the UE, or may be recommended by the UE to the base station. Optionally, an association relationship exists between the value of M and the RI. A specific association relationship may be predefined. For example, a table is predefined, and the base station configures the value of M by querying the table. For example, the value of M does not decrease with increase of the RI. Optionally, a table of associations between M and the RI may be similar to a form in the following table.

| RI | M |
|---|---|
| 1 to 2 | 2 |
| 3 to 4 | 4 |
| 5 to 6 | 6 |
| ... | ... |

The base station may configure a corresponding M value for the UE based on the RI reported by the UE. The specific association relationship may also be in other manners, and such manners are not excluded herein.

Based on the RI and the M reference signal resource indications that are reported, the UE further reports at least one of the PMI and the CQI. Herein the reported PMI is a target PMI obtained by combining measurements of M first reference signal resources, and may include one (wideband) PMI or a plurality of (subband) PMIs. The CQI is calculated based on the RI, the M reference signal resource indications, and the PMI. The PMI is used to indicate a number of a port selected from ports in each polarization direction. In a first manner, for each layer of data in RI-layer data, each PMI indicates that only one port is selected from the ports in each polarization direction. In a second manner, for each layer of data in RI-layer data, each PMI indicates that at least two ports are selected from the ports in each polarization direction, and the PMI includes numbers of the selected ports and a linear combination coefficient between the ports. A time of reporting the PMI and the CQI by the UE may be different from the time of reporting the M reference signal resource indications. When the time of reporting the PMI and the CQI is later than the time of reporting the M reference signal resource indications, the M reference signal resource indications based on which the PMI and the CQI are reported are M reference signal resource indications that are recently reported before the current reporting time.

Therefore, in the first feedback mode, assume that a feedback period of the RI is a first feedback period, and a feedback period of the M reference signal resource indications is a second feedback period, and a feedback period of the PMI and the CQI is a third feedback period. In this case, the first feedback period is k1 times the second feedback period, and the second feedback period is k2 times the third feedback period, where k1 is an integer greater than or equal to 1, and k2 is an integer greater than or equal to 1. A schematic diagram of the first feedback mode is shown in FIG. 3A.

If the second reporting mode is selected, the UE first reports M reference signal resource indications based on results of measuring the reference signals, where each reference signal resource indication is used to indicate a number of a reference signal resource and/or quality information of the reference signal resource. A method for reporting the M indications may be reporting beam numbers or port numbers or the like. The UE further determines the RI based on the M reported reference signal resource indications. A time of reporting the M reference signal resource indications by the UE may be different from a time of reporting the RI. When the time of reporting the RI is later than the time of reporting the M reference signal resource indications, the M reference signal resource indications based on which the RI is reported are M reference signal resource indications that are recently reported before the current reporting time.

Based on the M reference signal resource indications and the RI that are reported, the UE further reports at least one of the PMI and the CQI. Herein the reported PMI is a target PMI obtained by combining measurements of M first reference signal resources, and may include one (wideband) PMI or a plurality of (subband) PMIs. The CQI is calculated based on the RI, the M reference signal resource indications, and the PMI. The PMI is used to indicate a number of a port selected from ports in each polarization direction. In a first manner, for each layer of data in RI-layer data, each PMI indicates that only one port is selected from the ports in each polarization direction. In a second manner, for each layer of data in RI-layer data, each PMI indicates that at least two ports are selected from the ports in each polarization direction, and the PMI includes numbers of the selected ports and a linear combination coefficient between the ports. A time of reporting the PMI and the CQI by the UE may be different from the time of reporting the RI. When the time of reporting the PMI and the CQI is later than the time of reporting the RI, the RI based on which the PMI and the CQI are reported is an RI that is recently reported before the current reporting time.

Therefore, in the second feedback mode, assume that a feedback period of the M reference signal resource indications is a fourth feedback period, and a feedback period of the RI is a fifth feedback period, and a feedback period of the PMI and the CQI is a sixth feedback period. In this case, the fourth feedback period is k3 times the fifth feedback period, and the fifth feedback period is k4 times the sixth feedback period, where k3 is an integer greater than or equal to 1, and k4 is an integer greater than or equal to 1. A schematic diagram of the second feedback mode is shown in FIG. 3B.

For the first feedback mode and the second feedback mode, an advantage of the second manner of reporting the PMI lies in that CSI feedback precision and subsequent data transmission performance can be improved. Using the first feedback mode and RI=1 as an example, the following describes how to calculate a linear combination coefficient of a plurality of selected ports to report the PMI.

By measuring N=8 reference signals, the UE selects reference signals numbered 1 and 2 for N/2=4 reference signals (reference signal resource indications are 1 to 4 respectively) in the first polarization direction, and selects reference signals numbered 5 and 6 for N/2=4 reference signals (reference signal resource indications are 5 to 8 respectively) in the second polarization direction. In this case, the UE may estimate a channel coefficient of a subband based on the four reference signals: $X=[H \times u_1, H \times u_2, G \times u_1, \ldots, G \times u_2]$.

H is a channel coefficient from an antenna to the UE, where the antenna corresponds to a port in the first polarization direction. G is a channel coefficient from an antenna to the UE, where the antenna corresponds to a port in the second polarization direction. The UE may obtain a right primary singular vector $x=[v_1, v_2, u_1, \ldots, u_2]$ of X based on RI=1 by performing singular value decomposition on the channel coefficient X or by using other methods. In this case, the reference signal resource indications 1, 2, 5, and 6 and a coefficient $[v_1, v_2, u_1, \ldots, u_2]$ of each subband are a PMI reported by the UE. The channel coefficient X is M sets of CSI that are obtained by measuring the M selected reference signal resources, and the reported PMI $[v_1, v_2, u_1, \ldots, u_2]$ is a target PMI obtained based on the M sets of CSI.

Scenario 2

Refer to FIG. 4B.

UE measures N first reference signal resources sent by a base station. Each first reference signal resource is sent by using n ports. For n ports of a same first reference signal resource, a same precoding matrix is used to precode the measurement reference signal on the ports. To be specific, the n ports of the same first reference signal resource have a same beam direction, and the beam direction is a beam direction of the first reference signal. As shown in the figure, the base station sends N=2 first reference signal resources, where each first reference signal resource is sent by using n=4 ports, $u_1$ is a precoding vector of a first reference signal resource numbered 1, and $u_2$ is a precoding vector of a first reference signal resource numbered 2.

Optionally, the UE may autonomously select a feedback mode by measuring reference signals, and report the feedback mode to the base station. Optionally, the base station may notify, by using higher layer signaling (Radio resource control, RRC) or dynamic signaling (Downlink control information, DCI), the UE of a feedback mode that should be used. The UE measures the reference signals, and determines a set of channel state information CSI of the UE based on the selected feedback mode or the feedback mode configured by the base station. One set of CSI includes at least one of the following elements in the feedback mode: a rank indicator RI, a precoding matrix indicator PMI, a channel quality indicator CQI, a channel covariance matrix, and the channel eigenvector. The PMI may be a wideband PMI, or may be a plurality of subband PMIs; the channel covariance matrix may be a wideband channel covariance matrix, or may be a plurality of subband channel covariance matrices; and the channel eigenvector may be a wideband channel eigenvector, or may be a plurality of subband channel eigenvectors.

The feedback mode includes a first feedback mode and a second feedback mode. In the first feedback mode, the UE first determines at least one element in the CSI based on measurements of the N first reference signal resources, and determines M pieces of reference signal resource indication information based on the at least one element in the CSI. M is a positive integer less than or equal to N. In the M pieces of reference signal resource indication information, each reference signal resource indication is used to indicate an index of one first reference signal resource, and/or indicate quality information of the first reference signal resource, for example, received power (RSRP) or received quality (RSRQ). In the second feedback mode, the UE determines M pieces of reference signal resource indication information based on measurements of the N first reference signal resources, and determines each element in the CSI based on the M pieces of reference signal resource indication information.

The UE may determine the feedback mode in a plurality of manners. For example, the UE may measure received power of the N first reference signal resources. When the UE determines that there is more than one first reference signal resource whose received power exceeds a predetermined threshold, the UE may determine to use the first feedback mode to report the CSI. When the UE determines that there is only one first reference signal resource whose received power exceeds a predetermined threshold, the UE may determine to use the second feedback mode to report the CSI. The UE may further determine the feedback mode in other manners, and such manners are not excluded herein.

If the first feedback mode is used, the UE first determines to report the RI based on results of measuring first reference signals. The RI represents a quantity of layers of data that the UE instructs the base station to transmit on a same time-frequency resource in a subsequent data transmission process. After determining the RI, the UE reports M reference signal resource indications based on the RI, where each reference signal resource indication is used to indicate a number of a first reference signal resource and/or quality information of the first reference signal resource. A time of reporting the M reference signal resource indications by the UE may be different from a time of reporting the RI. When the time of reporting the M reference signal resource indications is later than the time of reporting the RI, the RI based on which the M reference signal resource indications are reported is an RI that is recently reported before the current reporting time.

Optionally, a value of M may be configured by the base station for the UE, or may be recommended by the UE to the base station. Optionally, the RI has a relationship with values of M and n. In an example, if the RI is an integer less than or equal to n, the value of M may be an integer greater than or equal to 1. In an example, if the RI is an integer greater than or equal to n, the value of M is an integer greater than 1. For example, if n=2, and RI=3, M configured by the base station may be a positive integer greater than or equal to RI/n=1.5. To be specific, M may be an integer greater than or equal to 2. A specific association relationship may be indicated by a table. The base station or the UE may determine M by querying the table.

Based on the RI and the M reference signal resource indications that are reported, the UE further reports at least one of the PMI, the CQI, the channel covariance matrix, and the channel eigenvector. Optionally, the PMI may be used to indicate a precoding matrix selected by the UE. Optionally, the precoding matrix indicated by the reported PMI includes M×n columns, and the precoding matrix is used for precoding on total M×n ports of M first reference signal resources indicated by the M reported reference signal resource indications. To be specific, measurements of the M first reference signal resources are combined into a target PMI. Optionally, the target PMI may be obtained by combining M pieces of CSI that are obtained by measuring the M reference signal resources. Optionally, one target PMI may be reported for an entire bandwidth, or one target PMI is reported for each subband. Optionally, the reported channel covariance matrix may include M covariance matrices, where each covariance matrix is a covariance matrix of a channel from n ports of one of the M reference signal resources to the UE. Alternatively, the reported channel covariance matrix may include one covariance matrix, where the covariance matrix is a covariance matrix of a channel from the M×n ports of the M reference signal resources to the UE. To be specific, measurements of the M first reference signal resources are combined into a target covariance matrix. One target covariance matrix may be reported for an entire bandwidth, or one target covariance matrix is reported for each subband. Similarly, the reported channel eigenvector may include M channel eigenvectors, where each channel eigenvector is a channel eigenvector of a channel from n ports of one of the M reference signal resources to the UE. Alternatively, the reported channel eigenvector includes one channel eigenvector, where the channel eigenvector is a channel eigenvector of a channel from the M×n ports of the M reference signal resources to the UE. To be specific, measurements of the M first reference signal resources are combined into a target channel eigenvector. One target channel eigenvector may be reported for an entire bandwidth, or one target channel eigenvector is reported for each subband. The CQI is calculated based on the M reference signal resource indications, the RI, and the PMI that are reported, or is calculated based on the M reference signal resource indications, the RI, the channel covariance matrix, or the channel eigenvector that is reported.

A time of reporting the PMI, the CQI, the channel covariance matrix, and the channel eigenvector by the UE may be different from a time of reporting the M reference signal resource indications. When the time of reporting the PMI, the CQI, the channel covariance matrix, and the channel eigenvector is later than the time of reporting the M reference signal resource indications, the M reference signal resource indications based on which the PMI, the CQI, the channel covariance matrix, and the channel eigenvector are reported are M reference signal resource indications that are recently reported before the current reporting time.

Optionally, the target PMI may be further used to report a set of linear combination coefficients of the total M×n ports of the M selected reference signal resources. The set of combination coefficients may be obtained by combining the M pieces of CSI that are obtained by measuring the M reference signal resources. A method for obtaining a linear combination coefficient is described by using M=2, n=2, and RI=1 as an example. The UE measures the N reference signal resources, and selects reference signal resources numbered 1 and 2. A channel matrix of a downlink channel from two ports of the reference signal resource numbered 1 to the UE is H, and a channel matrix of a downlink channel from two ports of the reference signal resource numbered 2 to the UE is G. Dimensions of H and M are both M×2, where M is a quantity of antennas of the UE. The UE performs singular value decomposition on the channel matrices H and G separately to obtain a primary eigenvector $v_1$ of H and a primary eigenvector $v_2$ of G, where both $v_1$ and $v_2$ are vectors whose dimensions are 2×1. The UE may first calculate equivalent channels H_eff and G_eff of two port groups based on $v_1$ and $v_2$, where H_eff=H×$v_1$, and G_eff=G×$v_2$, and the UE performs singular value decomposition or other calculation on a combined channel F=[H_eff G_eff] to obtain a primary eigenvector u, where u=($u_1$, $u_2$), and is a vector whose dimensions are 2×1, and includes two complex numbers $u_1$ and $u_2$. Then based on basis vector sets (predefined in a standard or configured by the base station) corresponding to the reference signal resources numbered 1 and 2 and the obtained primary eigenvector ($v_1$, $v_2$), the UE determines a linear combination coefficient ($a_1$, $a_2$) of n=2 ports of the reference signal resource numbered 1, and determines a linear combination coefficient ($b_1$, $b_2$) of n=2 ports of the reference signal resource numbered 2. The reported target PMI includes the following set of combination coefficients: ($u_1$, $u_2$, $a_1$, $a_2$, $b_1$, $b_2$). ($a_1$, $a_2$), and ($b_1$, $b_2$) are M=2 sets of CSI that are obtained by measuring two reference signal resources, and the coefficients ($u_1$, $u_2$) are further obtained on a basis of the M=2 sets of CSI. Therefore, the reported set of combination coefficients ($u_1$, $u_2$, $a_1$, $a_2$, $b_1$, $b_2$) is a PMI obtained by combining the two sets of CSI. One set of combination coefficients may be reported for an entire bandwidth, or one set of combination coefficients is reported for each subband. The combination coefficients may be further obtained in other manners, and such manners are not excluded herein.

Therefore, in the first feedback mode, assume that a feedback period of the RI is a first feedback period, and a feedback period of the M reference signal resource indications is a second feedback period, and a feedback period of the PMI, the CQI, the channel covariance matrix, and the channel eigenvector is a third feedback period. In this case, the first feedback period is k1 times the second feedback period, and the second feedback period is k2 times the third feedback period, where k1 is an integer greater than or equal to 1, and k2 is an integer greater than or equal to 1.

If the second reporting mode is used, the UE first reports M reference signal resource indications based on results of measuring reference signals, where each reference signal resource indication is used to indicate a number of a reference signal resource and/or quality information of the reference signal resource. The UE further determines the RI based on the M reported reference signal resource indications. A time of reporting the M reference signal resource indications by the UE may be different from a time of reporting the RI. When the time of reporting the RI is later than the time of reporting the M reference signal resource indications, the M reference signal resource indications based on which the RI is reported are M reference signal resource indications that are recently reported before the current reporting time.

Based on the RI and the M reference signal resource indications that are reported, the UE further reports at least one of the PMI, the CQI, the channel covariance matrix, and the channel eigenvector. Optionally, a precoding matrix indicated by the reported PMI includes M×n columns, and the precoding matrix is used for precoding on total M×n ports of M first reference signal resources indicated by the M reported reference signal resource indications. To be specific, measurements of the M first reference signal resources are combined into a target PMI. One target PMI may be reported for an entire bandwidth, or one target PMI is reported for each subband. Optionally, the reported channel covariance matrix may include M covariance matrices, where each covariance matrix is a covariance matrix of a channel from n ports of one of the M reference signal resources to the UE. Alternatively, the reported channel covariance matrix may include one covariance matrix, where the covariance matrix is a covariance matrix of a channel from the M×n ports of the M reference signal resources to the UE. To be specific, measurements of the M first reference signal resources are combined into a target covariance matrix. One target covariance matrix may be reported for an entire bandwidth, or one target covariance matrix is reported for each subband. Similarly, the reported channel eigenvector may include M channel eigenvectors, where each channel eigenvector is a channel eigenvector of a channel from n ports of one of the M reference signal resources to the UE. Alternatively, the reported channel eigenvector includes one channel eigenvector, where the channel eigenvector is a channel eigenvector of a channel from the M×n ports of the M reference signal resources to the UE. To be specific, measurements of the M first reference signal resources are combined into a target channel eigenvector. One target channel eigenvector may be reported for an entire bandwidth, or one target channel eigenvector is reported for each subband. The CQI is calculated based on the M reference signal resource indications, the RI, and the PMI that are reported, or is calculated based on the M reference signal resource indications, the RI, the channel covariance matrix, or the channel eigenvector that is reported. A time of reporting the PMI, the CQI, the channel covariance matrix, and the channel eigenvector by the UE may be different from a time of reporting the RI. When the time of reporting the PMI, the CQI, the channel covariance matrix, and the channel eigenvector is later than the time of reporting the RI, the RI based on which the PMI, the CQI, the channel covariance matrix, and the channel eigenvector are reported is an RI that is recently reported before the current reporting time.

Therefore, in the second feedback mode, assume that a feedback period of the M reference signal resource indications is a fourth feedback period, and a feedback period of the RI is a fifth feedback period, and a feedback period of the PMI and the CQI is a sixth feedback period. In this case, the fourth feedback period is k3 times the fifth feedback period, and the fifth feedback period is k4 times the sixth feedback period, where k3 is an integer greater than or equal to 1, and k4 is an integer greater than or equal to 1.

Optionally, the PMI may be further used to report a set of linear combination coefficients of the total M×n ports of the M selected reference signal resources. A specific obtaining manner is similar to a manner of obtaining a combination coefficient in the first feedback mode. Details are not described again.

Figure 5A:
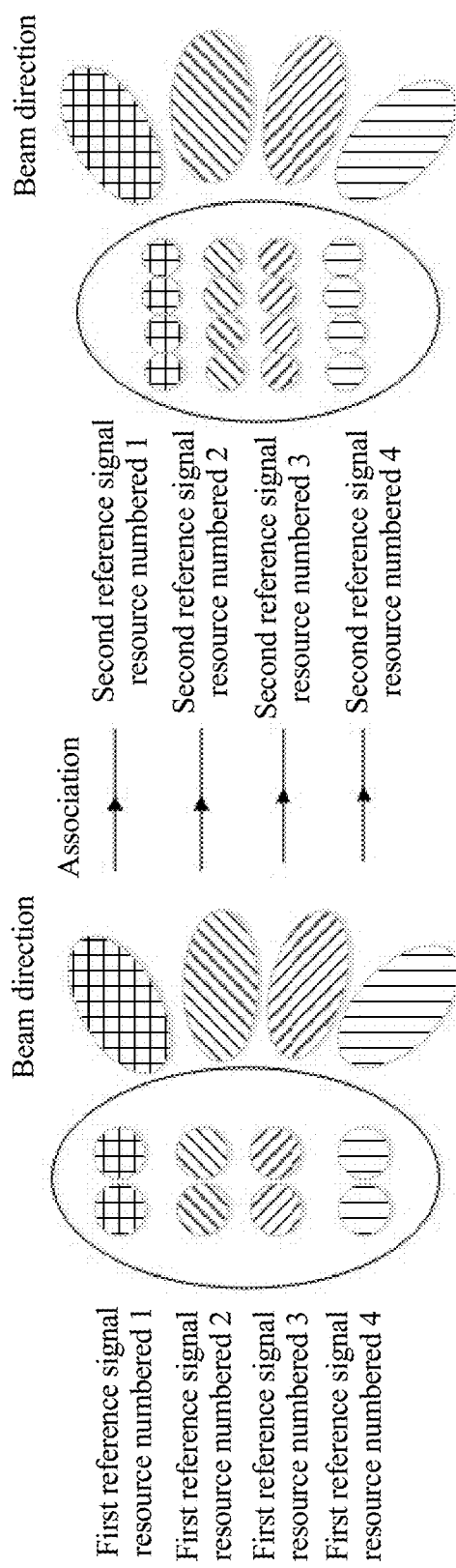
FIG. 5A is a schematic diagram of an association relationship between a first reference signal resource and a second reference signal resource in a channel state information feedback method according to this application.
Figure 5B:
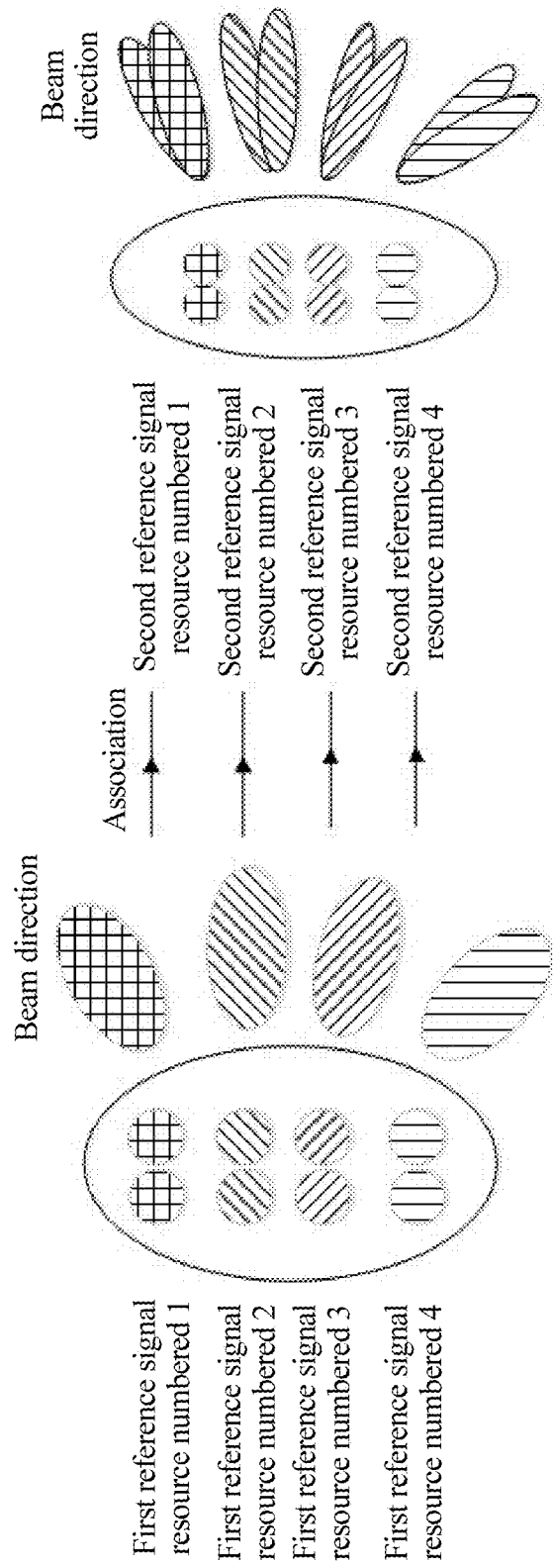
FIG. 5B is a schematic diagram of another association relationship between a first reference signal resource and a second reference signal resource in a channel state information feedback method according to this application.

Optionally, in the second feedback mode, the PMI, the CQI, the channel covariance matrix, and the channel eigenvector that are reported by the UE may be obtained based on measurements of N second measurement reference resources. An association relationship exists between the N first measurement reference resources and the N second reference signal resources. For example, a beam direction of an $i^{th}$ second reference signal resource is near to a beam direction of an $i^{th}$ first reference signal resource, and a port of the $i^{th}$ second reference signal resource includes a port of the $i^{th}$ first reference signal resource. Alternatively, a beam direction of an $i^{th}$ second reference signal resource is near to a beam direction of an $i^{th}$ first reference signal resource, and a beam width of the $i^{th}$ second reference signal resource may be narrower than a beam width of the $i^{th}$ first reference signal resource. Alternatively, an $i^{th}$ second reference signal resource corresponds to a beam group, and a direction of the beam group is near to that of a beam of an associated $i^{th}$ first reference signal resource. A specific association relationship may also be in other forms, and such forms are not excluded herein. Based on the association relationship, the base station may configure the corresponding second reference signal resources based on the M reference signal resource indications reported by the UE. The UE may measure the corresponding second reference signal resources based on the association relationship. Specifically, refer to FIG. 5A and FIG. 5B. FIG. 5A is a schematic diagram of an association relationship between a first reference signal resource and a second reference signal resource in a channel state information feedback method according to this application. FIG. 5B is a schematic diagram of another association relationship between a first reference signal resource and a second reference signal resource in a channel state information feedback method according to this application.

Referring to FIG. 5A, each of N=4 first reference signal resources includes two ports, and corresponds to a different beam direction. Each first reference signal resource is associated with a second reference signal resource. Each second reference signal resource has four ports, and corresponds to one beam direction. The beam direction corresponding to each second reference signal resource and a beam direction of an associated first reference signal resource are basically consistent.

Referring to FIG. 5B, each of N=4 first reference signal resources includes two ports, and corresponds to a different beam direction. Each first reference signal resource is associated with a second reference signal resource. Each second reference signal resource has two ports, and corresponds to one beam group, and each beam group includes two beams. Directions of the two beams in the beam group corresponding to each second reference signal resource and a beam direction of an associated first reference signal resource are basically consistent.

Figure 6:
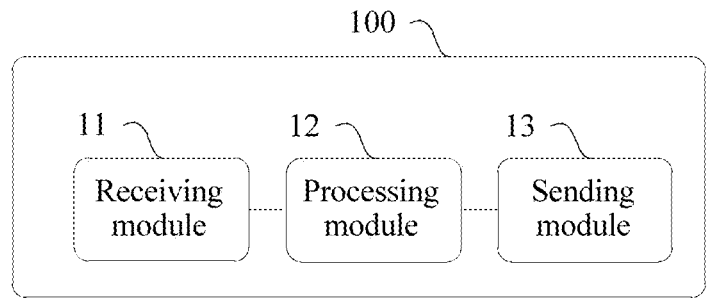
FIG. 6 is a schematic structural diagram of Embodiment 1 of user equipment according to this application.

FIG. 6 is a schematic structural diagram of Embodiment 1 of user equipment according to this application. The user equipment provided by this embodiment may implement each step of the method applied to the user equipment according to any embodiment of this application. Specifically, the user equipment 100 provided by this embodiment includes: a receiving module 11, configured to receive N first reference signal resources configured by a base station, where each of the N first reference signal resources includes at least one port, and N is an integer greater than or equal to 2; a processing module 12, configured to determine a channel state indication CSI and M pieces of first reference signal resource indication information based on a feedback mode, where the feedback mode indicates a sequence of determining each element in the CSI and the M pieces of first reference signal resource indication information, and the CSI includes at least one of the following elements: a rank indicator RI, a precoding matrix indicator PMI, a channel quality indicator CQI, a channel covariance matrix, or a channel eigenvector; and a sending module 13, configured to report the CSI and the M pieces of first reference signal resource indication information to the base station, where the M pieces of first reference signal resource indication information indicate an index and/or quality information of each of M first reference signal resources, the M first reference signal resources are M first reference signal resources in the N first reference signal resources, and M is an integer less than or equal to N.

After receiving the N first reference signal resources configured by the base station, and then determining the CSI of the first reference signal resources and the M pieces of first reference signal indication information based on the feedback mode, the user equipment provided by this application feeds back the CSI and the M pieces of first reference signal resource indication information to the base station. In this process, the UE feeds back the CSI of the M first reference signal resources in a horizontal dimension and the M pieces of first reference signal resource indication information to the base station, so that the base station determines channel state information in a vertical dimension based on the first reference signal resource indication information and finally obtains the channel state information in the two dimensions. This overcomes a disadvantage that only channel state information in a horizontal dimension is fed back in conventional channel estimation.

Optionally, in an embodiment of this application, the feedback mode includes a first feedback mode; and the processing module 12 is specifically configured to determine, in the first feedback mode, at least one element in the CSI based on the N first reference signal resources, and determine the M pieces of first reference signal resource indication information based on the at least one element in the CSI.

Optionally, in an embodiment of this application, the at least one element in the CSI is an RI that is recently reported before the UE determines the M pieces of first reference signal resource indication information, and the processing module 12 is specifically configured to determine, in the first feedback mode, the recently reported RI based on the N first reference signal resources, and determine the M pieces of first reference signal resource indication information based on the recently reported RI.

Optionally, in an embodiment of this application, the processing module 12 is further configured to: determine M second reference signal resources based on an association relationship, where the association relationship is an association relationship between the M first reference signal resources and the M second reference signal resources; and determine at least one of the PMI, the CQI, the channel covariance matrix, or the channel eigenvector based on the recently reported RI and the M second reference signal resources; and the sending module 13 is further configured to report the at least one of the PMI, the CQI, the channel covariance matrix, or the channel eigenvector to the base station.

Optionally, in an embodiment of this application, a feedback period of the RI is a first feedback period, a feedback period of the M pieces of first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

Optionally, in an embodiment of this application, when determining the recently reported RI based on the N first reference signal resources, and determining the M pieces of first reference signal resource indication information based on the recently reported RI, the processing module 12 is specifically configured to determine, in the first feedback mode, the recently reported RI based on the N first reference signal resources, and query a correspondence table based on the recently reported RI to determine the M pieces of first reference signal resource indication information, where the correspondence table stores a correspondence that exists between the RI and M.

Optionally, in an embodiment of this application, the feedback mode includes a second feedback mode; and the processing module 12 is specifically configured to determine, by the UE in the second feedback mode, the M pieces of first reference signal resource indication information based on the N first reference signal resources, and determine the CSI based on the M first reference signal resources indicated by the M pieces of first reference signal resource indication information.

Optionally, in an embodiment of this application, the M pieces of first reference signal resource indication information are M pieces of first reference signal resource indication information recently reported before the UE determines the CSI.

Optionally, in an embodiment of this application, the processing module 12 is specifically configured to determine, in the second feedback mode, the M pieces of first reference signal resource indication information based on the N first reference signal resources, and determine the RI in the CSI based on the M first reference signal resources indicated by the M pieces of first reference signal resource indication information.

Optionally, in an embodiment of this application, after determining, in the second feedback mode, the M pieces of first reference signal resource indication information based on the N first reference signal resources, and determining the RI in the CSI based on the M first reference signal resources indicated by the M pieces of first reference signal resource indication information, the processing module 12 is further configured to: determine M second reference signal resources based on an association relationship, where the association relationship is an association relationship between the M first reference signal resources and the M second reference signal resources; and determine at least one of the PMI, the CQI, the channel covariance matrix, or the channel eigenvector in the CSI based on the M second reference signal resources and the RI; and the sending module 13 is further configured to report the at least one of the PMI, the CQI, the channel covariance matrix, or the channel eigenvector to the base station.

Optionally, in an embodiment of this application, a feedback period of the M pieces of first reference signal resource indication information is a fourth feedback period, a feedback period of the RI in the CSI is a fifth feedback period, a feedback period of the PMI and the CQI in the CSI is a sixth feedback period, the fourth feedback period is k3 times the fifth feedback period, the fifth feedback period is k4 times the sixth feedback period, k3 is an integer greater than or equal to 1, and k4 is an integer greater than or equal to 1.

Optionally, in an embodiment of this application, the processing module 12 is further configured to: determine M sets of CSI based on the recently reported RI and the M second reference signal resources, where each of the M sets of CSI includes at least one of a PMI, a CQI, a channel covariance matrix, or a channel eigenvector; and combine the M sets of CSI into target CSI, where the target CSI includes at least one of a target PMI, a target CQI, a target channel covariance matrix, or a target channel eigenvector; and the sending module 13 is specifically configured to report a basis vector of the target PMI, a port index, or a combination coefficient to the base station, so that the base station determines the target PMI based on the basis vector of the target PMI, the port index, or the combination coefficient, and obtains the target CQI based on the target PMI.

Optionally, in an embodiment of this application, the receiving module 11 is further configured to receive the feedback mode configured by the base station by using higher layer signaling or dynamic signaling.

Optionally, in an embodiment of this application, the sending module 13 is further configured to feed back the feedback mode to the base station.

Figure 7:
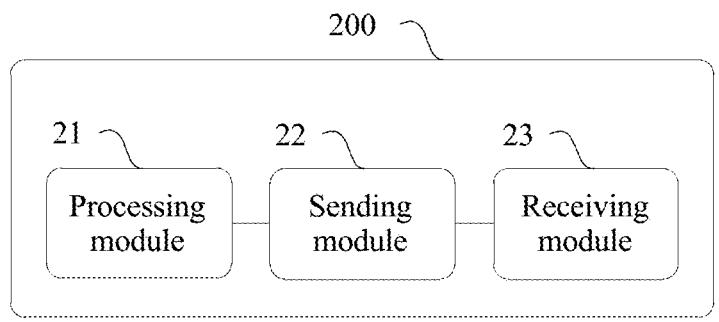
FIG. 7 is a schematic structural diagram of Embodiment 1 of a base station according to this application.

FIG. 7 is a schematic structural diagram of Embodiment 1 of a base station according to this application. The base station provided by this embodiment may implement each step of the method applied to the base station according to any embodiment of this application. Specifically, the base station 200 provided by this embodiment includes: a processing module 21, configured to configure N first reference signal resources, where each of the N first reference signal resources includes at least one port, and N is an integer greater than or equal to 2; a sending module 22, configured to send the N first reference signal resources to user equipment UE; and a receiving module 23, configured to receive a channel state indication CSI and M pieces of first reference signal resource indication information that are reported by the UE based on a feedback mode, where the feedback mode indicates a sequence of determining each element in the CSI and the M pieces of first reference signal resource indication information, and the CSI includes at least one of the following elements: a rank indicator RI, a precoding matrix indicator PMI, a channel quality indicator CQI, a channel covariance matrix, or a channel eigenvector, where the M pieces of first reference signal resource indication information indicate an index and/or quality information of each of M first reference signal resources, the M first reference signal resources are M first reference signal resources in the N first reference signal resources, and M is an integer less than or equal to N.

The base station provided by this application configures the N first reference signal resources for the UE, and sends the N first reference signal resources to the UE. After receiving the first reference signal resources, and then determining the CSI of the first reference signal resources and the M pieces of first reference signal indication information based on the feedback mode, the UE feeds back the CSI and the M pieces of first reference signal resource indication information to the base station. In this process, the UE feeds back the CSI of the M first reference signal resources in a horizontal dimension and the M pieces of first reference signal resource indication information to the base station, so that the base station determines channel state information in a vertical dimension based on the first reference signal resource indication information and finally obtains the channel state information in the two dimensions. This overcomes a disadvantage that only channel state information in a horizontal dimension is fed back in conventional channel estimation.

Optionally, in an embodiment of this application, the feedback mode includes a first feedback mode; and the receiving module 23 is specifically configured to receive, in the first feedback mode, the M pieces of first reference signal resource indication information determined by the UE based on at least one element in the CSI, where the at least one element in the CSI is determined by the UE based on the N first reference signal resources.

Optionally, in an embodiment of this application, the at least one element in the CSI is an RI that is recently reported before the UE determines the M pieces of first reference signal resource indication information, and the receiving module 23 is specifically configured to receive, in the first feedback mode, the M pieces of first reference signal resource indication information determined by the UE based on the recently reported RI, where the recently reported RI is determined by the UE based on the N first reference signal resources.

Optionally, in an embodiment of this application, after receiving, in the first feedback mode, the M pieces of first reference signal resource indication information determined by the UE based on the recently reported RI, the receiving module 23 is further configured to receive at least one of the PMI, the CQI, the channel covariance matrix, or the channel eigenvector that is reported by the UE, where the at least one of the PMI, the CQI, the channel covariance matrix, or the channel eigenvector is determined by the UE based on the recently reported RI and M second reference signal resources, the M second reference signal resources are determined based on an association relationship, and the association relationship is an association relationship between the M first reference signal resources and the M second reference signal resources.

Optionally, in an embodiment of this application, a feedback period of the RI is a first feedback period, a feedback period of the M pieces of first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

Optionally, in an embodiment of this application, the M pieces of first reference signal resource indication information are determined by the UE by determining the recently reported RI based on the N first reference signal resources, and querying a correspondence table based on the recently reported RI, where the correspondence table stores a correspondence that exists between the RI and M.

Optionally, in an embodiment of this application, the feedback mode includes a second feedback mode; and the receiving module 23 is specifically configured to receive, in the second feedback mode, the CSI determined by the UE based on the M pieces of first reference signal resource indication information, where the M pieces of first reference signal resource indication information are determined by the UE based on the N first reference signal resources.

Optionally, in an embodiment of this application, the M pieces of first reference signal resource indication information are M pieces of first reference signal resource indication information recently reported before the UE determines the CSI.

Optionally, in an embodiment of this application, the receiving module 23 is specifically configured to receive, in the second feedback mode, the RI determined by the UE based on the M first reference signal resources.

Optionally, in an embodiment of this application, after receiving the RI determined by the UE based on the M first reference signal resources, the receiving module 23 is further configured to receive at least one of the PMI, the CQI, the channel covariance matrix, or the channel eigenvector that is reported by the UE, where the at least one of the PMI, the CQI, the channel covariance matrix, or the channel eigenvector is determined by the UE based on M second reference signal resources, the M second reference signal resources are determined by the UE based on an association relationship, and the association relationship is an association relationship between the M first reference signal resources and the M second reference signal resources.

Optionally, in an embodiment of this application, a feedback period of the M pieces of first reference signal resource indication information is a fourth feedback period, a feedback period of the RI in the CSI is a fifth feedback period, a feedback period of the PMI and the CQI in the CSI is a sixth feedback period, the fourth feedback period is k3 times the fifth feedback period, the fifth feedback period is k4 times the sixth feedback period, k3 is an integer greater than or equal to 1, and k4 is an integer greater than or equal to 1.

Optionally, in an embodiment of this application, the receiving module 23 is specifically configured to receive target CSI reported by the UE, where the target CSI includes at least one of a target PMI, a target CQI, a target channel covariance matrix, or a target channel eigenvector, the target CSI is obtained by the UE by combining M sets of CSI, and the M sets of CSI are determined by the UE based on the recently reported RI and the M second reference signal resources.

Optionally, in an embodiment of this application, the sending module 22 is further configured to send higher layer signaling or dynamic information to the UE, where the higher layer signaling or dynamic signaling carries the feedback mode.

Optionally, in an embodiment of this application, the receiving module 23 is further configured to receive the feedback mode fed back by the UE.

Figure 8:
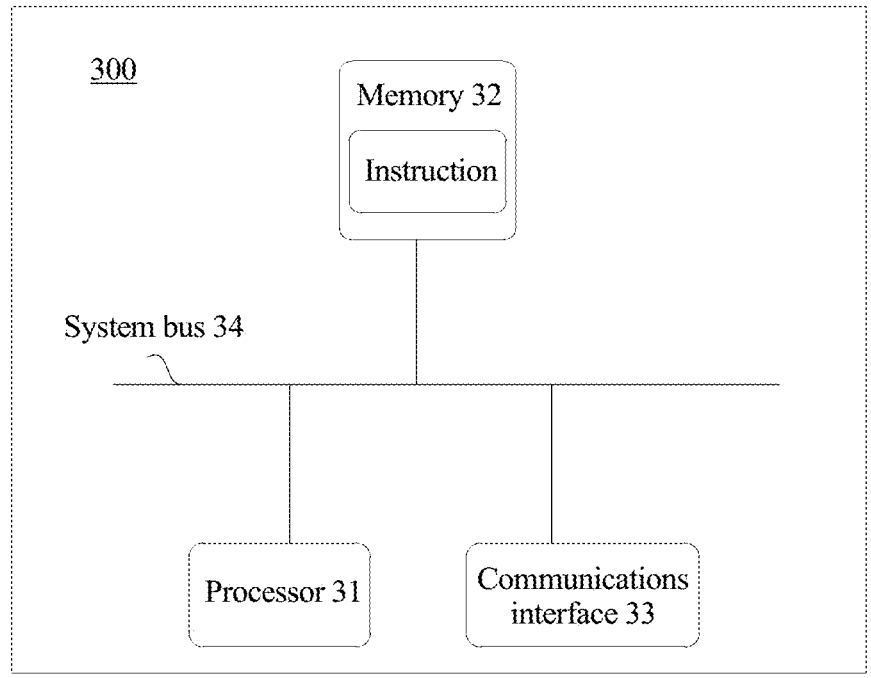
FIG. 8 is a schematic structural diagram of Embodiment 2 of user equipment according to this application.

FIG. 8 is a schematic structural diagram of Embodiment 2 of user equipment according to this application. The user equipment provided by this embodiment includes a processor 31, a memory 32, a communications interface 33, and a system bus 34. The memory 32 and the communications interface 33 are connected to and communicate with the processor 31 by using the system bus 34. The memory 32 is configured to store a computer-executable instruction. The communications interface 33 is configured to communicate with another device. The processor 31 is configured to run the computer-executable instruction, so that the user equipment performs each step of the foregoing method applied to the user equipment.

Figure 9:
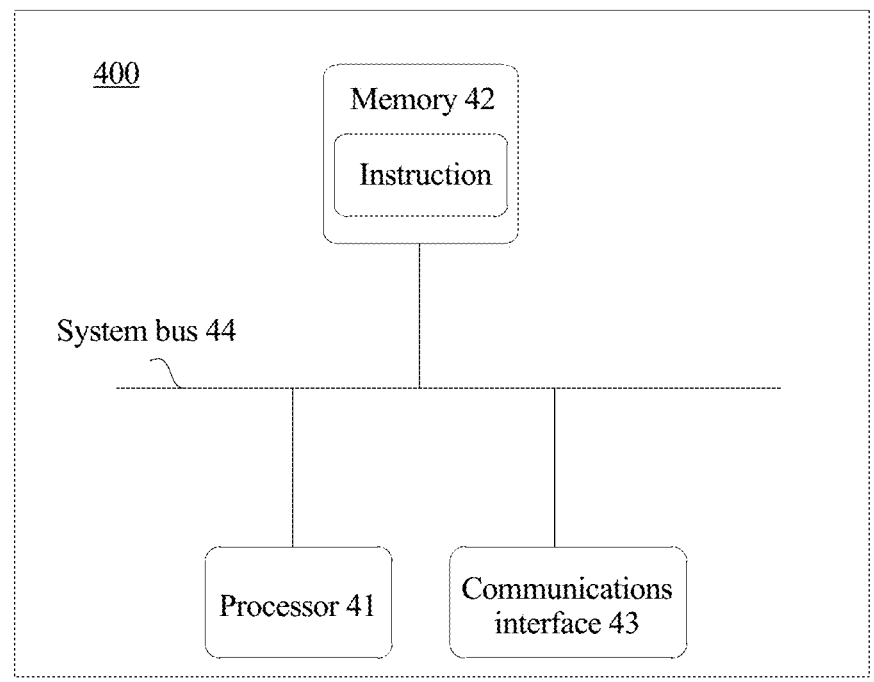
FIG. 9 is a schematic structural diagram of Embodiment 2 of a base station according to this application.

FIG. 9 is a schematic structural diagram of Embodiment 2 of a base station according to this application. The base station provided by this embodiment includes a processor 41, a memory 42, a communications interface 43, and a system bus 44. The memory 42 and the communications interface 43 are connected to and communicate with the processor 41 by using the system bus 44. The memory 42 is configured to store a computer-executable instruction. The communications interface 43 is configured to communicate with another device. The processor 41 is configured to run the computer-executable instruction, so that the base station performs each step of the foregoing method applied to the base station.

The system bus mentioned in FIG. 8 or FIG. 9 may be a peripheral component interconnect (PCI) bus or an extended industry standard architecture (EISA) bus, or the like. The system bus may be classified into an address bus, a data bus, a control bus, or the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a random access memory (RAM), or may further include a non-volatile memory, for example, at least one disk storage.

The processor may be a general purpose processor, including a central processing unit (CPU), a network processor (Network Processor, NP), or the like; or may further be a digital signal processor (DSP), an application-specific integrated circuit (ASIC), a field-programmable gate array (FPGA) or another programmable logic device, a discrete gate or transistor logic device, or a discrete hardware component.

What is claimed is:

1. A channel state information feedback method, comprising:
    receiving, by user equipment (UE), N first reference signal resources configured by a base station, wherein each of the N first reference signal resources comprises at least one port, and N is an integer greater than or equal to 2;
    determining, by the UE, a channel state indication (CSI) and M pieces of a first reference signal resource indication information based on a feedback mode, wherein the feedback mode indicates a sequence of determining each element in the CSI and the M pieces of the first reference signal resource indication information, and the CSI comprises at least one of the following elements: a rank indicator (RI), a precoding matrix indicator (PMI), a channel quality indicator (CQI), a channel covariance matrix, or a channel eigenvector, wherein the feedback mode comprises a first feedback mode and a second feedback mode different from the first feedback mode;
    determining, in the first feedback mode, the M pieces of the first reference signal resource indication information based on the at least one element in the CSI; and
    determining, in the second feedback mode, the CSI based on the M pieces of the first reference signal resource indication information; and
    reporting, by the UE, the CSI and the M pieces of the first reference signal resource indication information to the base station,
    wherein the M pieces of the first reference signal resource indication information indicate an index and/or quality information of each of M first reference signal resources, the M first reference signal resources are M first reference signal resources in the N first reference signal resources, and M is an integer less than or equal to N.

2. The method according to claim 1,
    wherein determining the CSI and the M pieces of the first reference signal resource indication information comprises:
    determining, by the UE in the first feedback mode, at least one element in the CSI based on the N first reference signal resources, and determining the M pieces of the first reference signal resource indication information based on the at least one element in the CSI.

3. The method according to claim 2, wherein the at least one element in the CSI is an RI that is recently reported before the UE determines the M pieces of the first reference signal resource indication information,
    wherein determining the at least one element in the CSI comprises determining, by the UE in the first feedback mode, the recently reported RI based on the N first reference signal resources, and
    wherein determining the M pieces of the first reference signal resource indication information comprises determining the M pieces of the first reference signal resource indication information based on the recently reported RI.

4. The method according to claim 3, wherein after determining the recently reported RI based on the N first reference signal resources, and determining the M pieces of the first reference signal resource indication information based on the recently reported RI, the method further comprises:
    determining, by the UE, M second reference signal resources based on an association relationship, wherein the association relationship is an association relationship between the M first reference signal resources and the M second reference signal resources;
    determining, by the UE, at least one of the PMI, the CQI, the channel covariance matrix, or the channel eigenvector based on the recently reported RI and the M second reference signal resources; and
    reporting, by the UE, the at least one of the PMI, the CQI, the channel covariance matrix, or the channel eigenvector to the base station.

5. The method according to claim 4, wherein a feedback period of the RI is a first feedback period, a feedback period of the M pieces of the first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

6. The method according to claim 3,
    wherein determining the recently reported RI based on the N first reference signal resources comprises determining, by the UE in the first feedback mode, the recently reported RI based on the N first reference signal resources, and
    wherein determining the M pieces of the first reference signal resource indication information based on the recently reported RI comprises querying a correspondence table based on the recently reported RI to determine the M pieces of the first reference signal resource indication information, wherein the correspondence table stores a correspondence that exists between the RI and M.

7. The method according to claim 1,
    wherein determining the CSI and the M pieces of the first reference signal resource indication information comprises:
    determining, by the UE in the second feedback mode, the M pieces of the first reference signal resource indication information based on the N first reference signal resources, and
    determining the CSI based on the M first reference signal resources indicated by the M pieces of the first reference signal resource indication information.

8. The method according to claim 7, wherein the M pieces of the first reference signal resource indication information are M pieces of the first reference signal resource indication information recently reported before the UE determines the CSI.

9. The method according to claim 8, wherein determining the M pieces of the first reference signal resource indication information based on the N first reference signal resources, and determining the CSI based on the M first reference signal resources indicated by the M pieces of the first reference signal resource indication information comprises:
    determining, by the UE in the second feedback mode, the M pieces of the first reference signal resource indication information based on the N first reference signal resources, and determining the RI in the CSI based on the M first reference signal resources indicated by the M pieces of the first reference signal resource indication information.

10. The method according to claim 9, wherein after determining, by the UE in the second feedback mode, the M pieces of the first reference signal resource indication information based on the N first reference signal resources, and determining the RI in the CSI based on the M first reference signal resources indicated by the M pieces of the first reference signal resource indication information, the method further comprises:
   determining, by the UE, M second reference signal resources based on an association relationship, wherein the association relationship is an association relationship between the M first reference signal resources and the M second reference signal resources;
   determining, by the UE, at least one of the PMI, the CQI, the channel covariance matrix, or the channel eigenvector in the CSI based on the M second reference signal resources and the RI; and
   reporting, by the UE, the at least one of the PMI, the CQI, the channel covariance matrix, or the channel eigenvector to the base station.

11. A communication apparatus, comprising:
   a receiver, configured to receive N first reference signal resources configured by a base station, wherein each of the N first reference signal resources comprises at least one port, and N is an integer greater than or equal to 2;
   a processor;
   a non-transitory memory storing a program to be executed in the processor, the program comprising instructions to
      determine a channel state indication (CSI) and M pieces of first reference signal resource indication information based on a feedback mode, wherein the feedback mode indicates a sequence of determining each element in the CSI and the M pieces of first reference signal resource indication information, and the CSI comprises at least one of the following elements: a rank indicator (RI), a precoding matrix indicator (PMI), a channel quality indicator (CQI), a channel covariance matrix, or a channel eigenvector, wherein the feedback mode comprises a first feedback mode and a second feedback mode different from the first feedback mode,
      determine, in the first feedback mode, the M pieces of the first reference signal resource indication information based on the at least one element in the CSI, and
      determine, in the second feedback mode, the CSI based on the M pieces of the first reference signal resource indication information; and
   a transmitter, configured to report the CSI and the M pieces of first reference signal resource indication information to the base station, wherein the M pieces of first reference signal resource indication information indicate an index and/or quality information of each of M first reference signal resources, the M first reference signal resources are M first reference signal resources in the N first reference signal resources, and M is an integer less than or equal to N.

12. The apparatus according to claim 11,
   wherein the program comprises further instructions to determine, in the first feedback mode, at least one element in the CSI based on the N first reference signal resources, and determine the M pieces of first reference signal resource indication information based on the at least one element in the CSI.

13. The apparatus according to claim 12, wherein the at least one element in the CSI is an RI that is recently reported before the UE determines the M pieces of first reference signal resource indication information, and wherein the program comprises further instructions to determine, in the first feedback mode, the recently reported RI based on the N first reference signal resources, and determine the M pieces of first reference signal resource indication information based on the recently reported RI.

14. The apparatus according to claim 13, wherein
   the program comprises further instructions to: determine M second reference signal resources based on an association relationship, wherein the association relationship is an association relationship between the M first reference signal resources and the M second reference signal resources; and determine at least one of the PMI, the CQI, the channel covariance matrix, or the channel eigenvector based on the recently reported RI and the M second reference signal resources; and
   the transmitter is further configured to report the at least one of the PMI, the CQI, the channel covariance matrix, or the channel eigenvector to the base station.

15. The apparatus according to claim 14, wherein a feedback period of the RI is a first feedback period, a feedback period of the M pieces of first reference signal resource indication information is a second feedback period, a feedback period of the PMI and the CQI is a third feedback period, the first feedback period is k1 times the second feedback period, the second feedback period is k2 times the third feedback period, k1 is an integer greater than or equal to 1, and k2 is an integer greater than or equal to 1.

16. The apparatus according to claim 13, wherein when determining the recently reported RI based on the N first reference signal resources, and determining the M pieces of first reference signal resource indication information based on the recently reported RI, wherein the program comprises further instructions to determine, in the first feedback mode, the recently reported RI based on the N first reference signal resources, and query a correspondence table based on the recently reported RI to determine the M pieces of first reference signal resource indication information, wherein the correspondence table stores a correspondence that exists between the RI and M.

17. The apparatus according to claim 11, wherein
   the program comprises further instructions to determine, by the UE in the second feedback mode, the M pieces of first reference signal resource indication information based on the N first reference signal resources, and determine the CSI based on the M first reference signal resources indicated by the M pieces of first reference signal resource indication information.

18. The apparatus according to claim 17, wherein
   the M pieces of first reference signal resource indication information are M pieces of first reference signal resource indication information recently reported before the UE determines the CSI.

19. The apparatus according to claim 18, wherein the program comprises further instructions to determine, in the second feedback mode, the M pieces of first reference signal resource indication information based on the N first reference signal resources, and determine the RI in the CSI based on the M first reference signal resources indicated by the M pieces of first reference signal resource indication information.

20. The apparatus according to claim 19, wherein
   after determining, in the second feedback mode, the M pieces of first reference signal resource indication information based on the N first reference signal resources, and determining the RI in the CSI based on the M first reference signal resources indicated by the M pieces of first reference signal resource indication information, wherein the program comprises further instructions to: determine M second reference signal resources based on an association relationship, wherein the association relationship is an association relationship between the M first reference signal resources and the M second reference signal resources; and determine at least one of the PMI, the CQI, the channel covariance matrix, or the channel eigenvector in the CSI based on the M second reference signal resources and the RI; and the transmitter is further configured to report the at least one of the PMI, the CQI, the channel covariance matrix, or the channel eigenvector to the base station.

\* \* \* \* \*